US007488503B1

(12) United States Patent
Porzio et al.

(10) Patent No.: US 7,488,503 B1
(45) Date of Patent: *Feb. 10, 2009

(54) ENCAPSULATION COMPOSITIONS AND PROCESSES FOR PREPARING THE SAME

(75) Inventors: Michael A. Porzio, Monkton, MD (US); Dmitriy Zasypkin, Cockeysville, MD (US)

(73) Assignee: McCormick & Company, Inc., Sparks, MD (US)

( * ) Notice: Subject to any disclaimer, the term of this patent is extended or adjusted under 35 U.S.C. 154(b) by 536 days.

This patent is subject to a terminal disclaimer.

(21) Appl. No.: 10/812,883

(22) Filed: Mar. 31, 2004

Related U.S. Application Data

(60) Provisional application No. 60/487,930, filed on Jul. 18, 2003, provisional application No. 60/458,421, filed on Mar. 31, 2003.

(51) Int. Cl.
*A22L 1/22* (2006.01)

(52) U.S. Cl. .................. 426/293; 426/96; 426/98; 426/103; 426/658

(58) Field of Classification Search .................. 426/96, 426/98, 103, 658, 293; 424/439, 408
See application file for complete search history.

(56) References Cited

U.S. PATENT DOCUMENTS

| | | | | |
|---|---|---|---|---|
| 3,971,852 A | * | 7/1976 | Brenner et al. .............. | 426/103 |
| 4,232,047 A | * | 11/1980 | Sair et al. ...................... | 426/96 |
| 4,515,769 A | | 5/1985 | Merritt et al. | |
| 4,689,235 A | * | 8/1987 | Barnes et al. ................ | 426/89 |
| 4,820,534 A | * | 4/1989 | Saleeb et al. ................. | 426/96 |
| 5,009,900 A | * | 4/1991 | Levine et al. ................. | 426/96 |
| 5,087,461 A | * | 2/1992 | Levine et al. ................. | 426/96 |
| 5,124,162 A | * | 6/1992 | Boskovic et al. ............. | 426/96 |
| 5,468,286 A | * | 11/1995 | Wai-Chiu et al. ...... | 106/205.01 |
| 5,601,865 A | * | 2/1997 | Fulger et al. ................. | 426/650 |
| 5,603,971 A | * | 2/1997 | Porzio et al. ................. | 426/96 |
| 5,756,136 A | * | 5/1998 | Black et al. .................. | 426/89 |
| 5,792,505 A | * | 8/1998 | Fulger et al. ................. | 426/650 |
| 5,846,580 A | * | 12/1998 | Franke et al. ................ | 426/62 |
| 5,897,897 A | * | 4/1999 | Porzio et al. ................. | 426/96 |
| 5,972,395 A | * | 10/1999 | Saleeb et al. ................. | 426/96 |
| 6,187,351 B1 | * | 2/2001 | Porzio et al. ................. | 426/96 |
| 6,416,799 B1 | * | 7/2002 | Porzio et al. ................. | 426/96 |
| 6,436,453 B1 | * | 8/2002 | van Lengerich et al. ....... | 426/74 |
| 6,468,568 B1 | * | 10/2002 | Leusner et al. ............... | 426/72 |
| 6,652,895 B2 | * | 11/2003 | Porzio et al. ................. | 426/96 |
| 6,790,453 B2 | * | 9/2004 | Porzio et al. ................ | 424/408 |
| 2001/0048965 A1 | | 12/2001 | Cherukurl | |
| 2002/0187223 A1 | * | 12/2002 | McIver et al. ................ | 426/96 |
| 2004/0241444 A1 | * | 12/2004 | Porzio et al. ........... | 428/402.21 |
| 2005/0208141 A1 | * | 9/2005 | Farber et al. ................ | 424/488 |

OTHER PUBLICATIONS

U.S. Appl. No. 10/812,882, filed Mar. 31, 2004, Porzio, et al.
U.S. Appl. No. 10/812,883, filed Mar. 31, 2004, Porzio, et al.
R. N. Ammeraal et al, "High-performance anion-exchange chromatography with pulsed amperometric detection of linear and branched glucose oligosaccharides", *Carbohydrate Research*, 215, 1991, pp. 179-192.
S.A.S. Craig et al, "Polydextrose as Soluble Fiber: Physiological and Analytical Aspects", *Cereal Foods World*, vol. 43, No. 5, May 1998, pp. 370-376.
M. Glicksman, "Gum Technology in the Food Industry", Academic Press, Inc., 1969, pp. 98-100 and 360-365.
A.C. Hoefler, Hydrocolloids, Eagan Press Handbook Series, 2004, pp. 5-25.
J.X. Jiang et al, "Characterization of Galactomannan Gum from Fenugreek Trigonella foenum-graecum) Seeds and its Rheological Properties", *International Journal of Polymeric Materials*, 56, 2007, pp. 1145-1154.
C.M. Keary, "Characterization of METHOCEL cellulose ethers by aqueous SEC with multiple detectors", *Carbohydrate Polymers*, 45, 2001, pp. 293-303.
G.O. Phillips et al, Handbook of hydrocolloids, Woodhead Publishing Limited, 2000, pp. 25-30 and 230-235.
R. L. Whistler et al, Carbohydrate Chemistry for Food Scientists, Eagan Press, 1997, pp. 160-164.
J. B. Harborne et al, Chemical Dictionary of Economic Plants, John Wiley & Sons, Ltd., 2001, pp. 147, 149, 151-155.
G.A. Burdock et al, Encyclopedia Food and Color Additives, vol. I, A-E, CRC Press, Inc. 1997, pp. 194-196.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Matrix compositions which contain a mixture of two different food polymers are useful for encapsulating encapsulates, such as flavoring agents.

24 Claims, 3 Drawing Sheets

ENCAPSULATION COMPOSITIONS AND PROCESSES FOR PREPARING THE SAME

CROSS REFERENCES TO RELATED APPLICATIONS

This application claims priority to U.S. Provisional Patent Application No. 60/458,421, filed on Mar. 31, 2003, and U.S. Provisional Patent Application No. 60/487,930, filed on Jul. 18, 2003, both of which are incorporated herein by reference in their entireties.

BACKGROUND OF THE INVENTION

1. Field of the Invention

The present invention relates to encapsulation compositions in which an encapsulate is encapsulated in a glassy matrix. More particularly, the present invention relates to flavor encapsulation compositions in which a flavoring agent is encapsulated in a glassy matrix. The present invention further relates to processes for preparing such compositions.

2. Discussion of the Background

The encapsulation of encapsulates is an area of active research. In particular, the encapsulation of encapsulates such as medications, pesticides (including insecticides, nematocides, herbicides, fungicides, microbiocides, etc.) preservatives, vitamins and flavoring agents is desired for a number of reasons. In the case of medications and pesticides, encapsulation may be desired to achieve the controlled release of the medication or pesticide. For vitamins, encapsulation may be carried out to protect the vitamin from air-oxidation and, thus, to extend shelf life of the vitamin. In the case of flavoring agents, the encapsulation may be carried out to place the flavoring in an easily metered form which will release the agent at a controllable event, such as the addition of water.

It is generally known to skilled practitioners in the field of flavor encapsulation that the current practical commercial processes leading to stable, dry flavors are limited in great part to spray drying and extrusion fixation. The former process requires emulsification or solubilization of the flavor in an aqueous carrier containing the encapsulation solids, followed by rapid drying in a high temperature, high velocity gas stream and collection as a low-density bulk solid.

While spray drying accounts for the majority of commercially encapsulated flavor materials, several limitations of the process are evident. Low molecular weight components of complex or natural flavor mixtures generally exhibit high vapor pressures and are usually lost or disproportionate during the process. The resultant flavor-carriers are porous and difficult to handle. In addition, deleterious chemical reactions such as oxidation can result on surfaces exposed during and after drying. The final product, a dry, free flowing powder, will release the encapsulant rapidly upon hydration whether rapid release is desired or not.

U.S. Pat. No. 3,971,852 discloses the use modified starch, gums and other food polymers with low molecular weight polyhydroxy compounds and spray drying to yield a glassy matrix with encapsulated oil at a maximum of 70-80% by volume. The system forms a shell surrounding the oil flavoring but is limited to lipophilic flavoring agents.

U.S. Pat. No. 4,532,145 discloses a process for preparing compositions in which a volatile flavorant is fixed by spray drying from a carrier solution made up of 10-30% of a low molecular weight component such as a sugar or edible food acid with the balance of the solids being a maltodextrin carbohydrate in the amount of 70-90%.

U.S. Pat. No. 5,124,162 discloses a carrier mixture composed of mono- and disaccharides (22-45%), maltodextrins (25-50%), and a high molecular weight carbohydrate such as chemically modified starch, gum arabic or gum acacia (10-35%) to which flavoring agents are added and the subsequent solution is spray dried to yield a free flowing powder with a bulk density of 0.50 g/cc.

U.S. Pat. No. 5,601,760 discloses a carrier mixture utilizing whey protein isolates to encapsulate lipid flavor systems. The protein constitutes 35 to 100% of the encapsulating matrix with the remainder consisting of sugars. Other disclosed proteins include whey protein concentrates, $\beta$-lactoglobulin and $\alpha$-lactoalbumin.

However, a number of technical issues are unmet by these approaches. First, thermally sensitive flavors undergo undesirable reactions including oxidations, rearrangements, and hydrolyses. Secondly, volatile components are lost or disproportionate during atomization and evaporation in the dryer.

A second process route, melt encapsulation, has been utilized to advantage with lipid-based flavors. In this technology, a melt is prepared by boiling off sufficient water from a high solids carbohydrate syrup, adding flavoring oils with an emulsifier, agitating under pressure to emulsify the oil in the melt and injecting the mixture into a chilling, dehydrating solvent bath to obtain fine rod-like filaments. After solvent removal, the matrix is reduced in size and, in some cases, coated with an anti-caking agent before being packed. See, e.g., U.S. Pat. Nos. 2,809,895; 3,041,018; 2,856,291; 2,857,821; and 3,704,137. Subsequent improvements in the art are disclosed in U.S. Pat. No. 3,314,803, for the encapsulation of volatiles such as acetaldehyde, and in U.S. Pat. No. 4,707,367, which discloses encapsulation of up to 35% by weight flavor oil in the glassy matrix.

U.S. Pat. No. 4,689,235 discloses the use of modified starch-maltodextrin carriers in the range of 5 parts modified starch:95 parts maltodextrin to 95 parts modified starch:5 parts maltodextrin. The carrier is dissolved to form a syrup, the water is cooked off, flavor is added and emulsified, and the melt is injected into a solvent bath.

An alternative route to encapsulating flavors is disclosed in U.S. Pat. No. 4,230,687. In this approach, high molecular weight carriers such as proteins, starches and gums are plasticized by addition of significant amounts of water in the presence of the encapsulate and subjected to a high shear dispersing process. The rubbery or plastic matrix with encapsulate is then extruded, recovered and dried to yield a stable product.

Another alternative process, melt extrusion, can be utilized for flavor fixation and encapsulation. In this process, a melting system, i.e., an extruder, is employed to form the carrier melt in a continuous process. The encapsulated flavor is either admixed or injected into the molten carbohydrate carrier.

U.S. Pat. No. 4,420,534 discloses the use of a matrix composition consisting of 10-30% of a low molecular weight component chosen from a series of mono- and disaccharides, corn syrup solids, or organic acid with the balance of the mixture being maltodextrin. The matrix is dry blended with an anhydrous liquid flavoring component and melted in a single screw extruder to yield a solid matrix characterized as a glass with a glass transition temperature greater than 40° C.

U.S. Pat. No. 5,972,395 discloses the use of a matrix composed of 15 to 40% of a high molecular weight carrier, preferably a maltodextrin and at least 40% of a low molecular weight carbohydrate, sugar polyol, or adipic acid. The matrix is extruded to yield a solid matrix characterized as a glass.

U.S. Pat. Nos. 5,087,461 and 5,009,900 disclose utilizing a composition consisting of a modified food starch, maltodextrin, polyol, and mono- and disaccharide components. The starch is a chemically-modified water-soluble starch and is used in the amount of 40 to 80% of the total mixture. The balance of the composition is comprised of 10 to 40% maltodextrin, 5 to 20% corn syrup solids or polydextrose, and 5 to 20% mono- or disaccharide. This matrix is said to balance processing response with glass matrix character.

U.S. Pat. No. 5,756,136 discloses the encapsulation of cinnamic aldehyde in a matrix containing at least 25% of a whey protein isolate. The resulting encapsulate exhibits a control release functionality and protection for yeast-leavened dough.

U.S. Pat. Nos. 6,652,895; 6,416,799; 6,187,351; 5,603,971; and 5,987,897 disclose the use of a series of extrusion matrix compositions. The use of water to plasticize the matrix in the extrusion process yields an encapsulated flavor matrix characterized by glass transition temperatures greater than 40° C. In U.S. Pat. No. 6,652,895, a composition containing a carboxylate or sulfate containing food polymer and the presence of calcium ions in the melt is disclosed. In U.S. Pat. No. 6,416,799, a composition containing a maltodextrin with buffering organic acid-acid salts is disclosed. In U.S. Pat. No. 6,187,351, a composition containing 2 to 45% of a food polymer, 25 to 80% of a maltodextrin, and 10 to 30% of a mono- or disaccharide or 24 D.E. to 42 D.E. corn syrup solids is disclosed. The matrix is dry blended, fed into the extruder with the required water plasticizer and flavor, and the resulting encapsulate is obtained as a glassy solid exhibiting a glass transition temperature greater than 40° C. The disclosed polymers include modified celluloses, high methoxy pectin, gum arabic (acacia), locust bean gum, guar gum, and lesser gums such as gum ghatti, gum tragacanth and gum karaya. Also disclosed are proteins such as gelatin and α-casein, microbial gums such as xanthan and gellan, pregelatinized starches in addition to other carbohydrate polymers such as inulins, β-glucans and konjac flour.

U.S. Patent Application US2002/0189493 A1 discloses the use of majority, single polymer component compositions with melt extrusion encapsulation. In one case, a matrix composed of a binary polymer composition selected from the group of gelatin, hydrolyzed gelatin, larch gum and gum arabic at 0 to 50% of the individual polymers is disclosed.

U.S. Patent Application US2002/0187223 A1 teaches the use of prehydrated agar agar (at 1-7% levels) with other carriers which are mixed with a flavor, extruded and dried to form a glassy matrix encapsulating media.

U.S. Pat. No. 4,816,298 discloses the preparation of a cold-water dispersible granular composition comprising a plasticizer and thermally moldable polymer. The polymers are selected from the group of methyl cellulose, hydroxypropyl methylcellulose, carboxymethyl cellulose, and hydroxypropylcellulose and are extruded at an elevated temperature with plastizer to yield a cold-water dispersible matrix.

In a number of the cited patents which disclose melt extrusion, the matrix compositions were carefully defined to accommodate processing limitations of the extruder as well as to generate a stable matrix in the glassy state and characterized by a glass transition temperature of greater than 40° C.

Formation of a matrix in the glassy state is of particular value for encapsulation of water-soluble flavorings and extracts. The role of water as a plasticizing agent conflicts with the desired results, because water has the effect of lowering the glass transition temperature (Tg) of the glassy matrix. In model studies of a number of food carbohydrate systems, the upper limit of water content is approximately 7 to 10 wt. % for lower molecular weight components such as mono- and disaccharides, maltodextrins, food polymers and combinations of these agents. At higher water contents, the Tg is lowered to the extent that the matrix is in the undesirable rubbery, plastic or fluid state at room temperatures.

In order to insure a higher Tg, several options are available. By limiting the class of encapsulate materials to lipophilic materials such as citrus oils, plasticizing moisture can be removed by a boil off process as described in U.S. Pat. Nos. 2,856,291; 2,857,821; 2,809,895; 3,041,018; 3,314,803; 3,704,137; and 4,707,367. Alternatively, the use of melt encapsulation disclosed in U.S. Pat. No. 4,420,534 limits the flavoring agents to materials with lower vapor pressure which can be admixed to the premelt composition. In addition, flavorings which are in the form of aqueous extracts, water, or alcohol-water solutions will result in a product with a Tg much below 25° C. leading to plastic flow and loss of volatiles upon storage.

Similarly, in U.S. Pat. Nos. 5,009,900 and 5,972,395, the flavorings are limited to those with limited volatility, and total moisture level in the product is less than 11% by weight. Many of the key topnotes and unique flavor components of complex flavors have high vapor pressures at room temperature and are not easily encapsulated by such a process.

Matrix improvements for the continuous melt extrusion process are described in U.S. Pat. Nos. 6,652,895; 6,416,797; 6,187,351; 5,603,971; and 5,987,897. The use of modified starch and food polymers with low molecular weight carbohydrate plasticizers is detailed to yield encapsulates in a glassy matrix with a Tg greater than 40° C. However with these matrices the flavor loads are generally limited to 10 wt. % or less.

Preparation of a solid in the glassy state is dependent upon both matrix composition and the process used to generate the encapsulating material. The advantages of retaining the glass form of the matrix include increased physical stability of the solid, reduced loss of incorporated volatiles, and reduction of deleterious intermolecular reactions and oxidation. A detailed discussion of the physical chemistry of water-food polymer interactions relating to the glassy state can be found in H. Levine and L. Slade, "Glass Transitions in Foods," in *Physical Chemistry of Foods*, H. Schwartzberg and R. Hartel, Eds., Marciel Dekker, New York, pp. 83-205, 1992; and in H. Levine and L. Slade, "Water as a Plasticizer: physico-chemical aspects of low-moisture polymeric systems," in *Water Science Reviews*, vol. 3, F. Franks, Ed. Cambridge University Press, London, pp. 79-185, 1988, which are incorporated herein by reference. The role of water as a plasticizer with food polymers, as well as the relationships between molecular compositions and dynamics of interactions between various components, are discussed in these references.

Thus, there remains a need for encapsulation compositions in which an encapsulate is encapsulated in a matrix which is stable in the glass state at ambient temperatures. In particular, there remains a need for flavor encapsulation compositions in which a flavoring agent is encapsulated in a matrix which is stable in the glassy state at room temperature, i.e., has a Tg sufficiently high to prevent caking and plastic flow at ambient room temperatures. There also remains a need for flavor encapsulation compositions which have a high Tg and are amenable for encapsulating volatile and sensitive flavor components. There also remains a need for encapsulation compositions which exhibit controlled release functionality. Finally there also remains a need for processes for preparing such compositions.

SUMMARY OF THE INVENTION

Accordingly, it is one object of the present invention to provide novel encapsulation compositions.

It is another object of the present invention to provide novel encapsulation compositions in which an encapsulate is encapsulated in a matrix which is stable in the glassy state at ambient temperatures.

It is another object of the present invention to provide novel flavor encapsulation compositions in which a flavoring agent is encapsulated in a matrix which is stable in the glassy state at ambient temperatures.

It is another object of the present invention to provide novel flavor encapsulation compositions which are amenable to the encapsulation of volatile or sensitive flavor components.

It is another object of the present invention to provide novel flavor encapsulation compositions which exhibit selected controlled release functionality in product applications.

It is another object of the present invention to provide novel processes for preparing such encapsulation compositions.

These and other objects, which will become apparent during the following detailed description, have been achieved by the inventors' discovery that it is possible to prepare food polymer-based glassy matrices, which have sufficiently high Tg to prevent plastic flow and caking at ambient temperatures, by interacting two or more food polymers with an aqueous plasticizer in the melting zone of an extruder, adding the encapsulant to the molten matrix, and extruding the resulting mixture.

The inventors have also discovered that compositions comprising:

(A) an encapsulate, encapsulated in:
(B) a glassy matrix, wherein said glassy matrix is selected from the group consisting of:

(a) a composition, comprising:
  ($a_1$) 5 to 95% by weight, based on the total weight of said composition (a), of a first n-octenylsuccinic anhydride-modified starch; and
  ($a_2$) 5 to 90% by weight, based on the total weight of said composition (a), of a second n-octenylsuccinic anhydride-modified starch; and
  ($a_3$) 0 to 45% by weight, based on the total weight of said composition (a), of a component selected from the group consisting of sugars, polyols, corn syrup solids, and mixtures thereof, with the proviso that said first n-octenylsuccinic anhydride-modified starch and said second n-octenylsuccinic anhydride-modified starch are different from each other;

(b) a composition, comprising:
  ($b_1$) 5 to 95% by weight, based on the total weight of said composition (b), of a first food polymer;
  ($b_2$) 5 to 90% by weight, based on the total weight of said composition (b), of a second food polymer; and
  ($b_3$) 0 to 45% by weight, based on the total weight of said composition (b), of a component selected from the group consisting of sugars, polyols, corn syrup solids, and mixtures thereof, wherein said first food polymer is an n-octenylsuccinic anhydride-modified starch, and wherein said second food polymer is selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan;

(c) a composition, comprising:
  ($c_1$) 5 to 95% by weight, based on the total weight of said composition (c), of a first food polymer;
  ($c_2$) 5 to 90% by weight, based on the total weight of said composition (c), of a second food polymer; and
  ($C_3$) 0 to 45% by weight, based on the total weight of said composition (c), of a component selected from the group consisting of sugars, polyols, corn syrup solids, and mixtures thereof wherein said first food polymer and said second food polymer are selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, with the proviso that said first food polymer and said second food polymer are different from each other; and (d) a composition, comprising:
  ($d_1$) 5 to 95% by weight, based on the total weight of said composition (d), of a first food polymer;
  ($d_2$) 5 to 70% by weight, based on the total weight of said composition (d), of a second food polymer;
  ($d_3$) 5 to 70% by weight, based on the total weight of said composition (d), of a third food polymer; and
  ($d_4$) 0 to 45% by weight, based on the total weight of said composition (d), of a component selected from the group consisting of sugars, polyols, corn syrup solids, and mixtures thereof, wherein said first food polymer and said second food polymer are selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, and wherein said third food polymer is selected from the group consisting of n-octenylsuccinic anhydride-modified starches, exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, with the proviso that said first food polymer, said second food polymer, and said third food polymer are all different from each other, are stable in the glassy state, i.e., have a sufficiently high Tg to prevent plastic flow and caking at ambient temperature.

The inventors have also discovered that the present encapsulation compositions may be prepared by a process comprising:

(i) mixing a matrix composition (B) with a liquid plasticizer and an encapsulate (A) in an extruder, to obtain a melted mixture comprising encapsulate (A) and matrix (B); and
(ii) extruding said melted mixture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
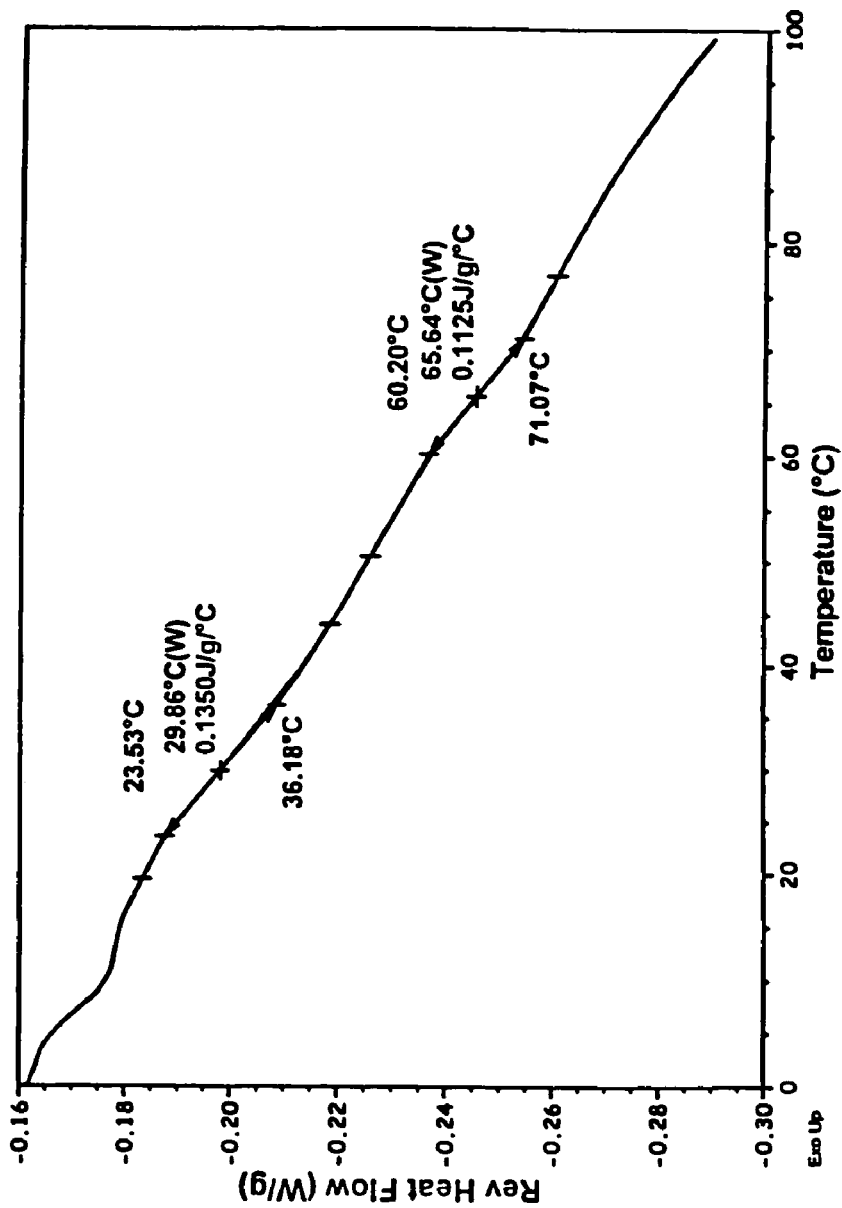
FIG. 1 is a Modulated Differential Scanning Calorimetric (MDSC) plot of a double 'glass transition' obtained from a matrix consisting of a first n-octenylsuccinic anhydride-modified starch and a second n-octenylsuccinic anhydride-modified starch as a binary extruded polymer-polymer matrix as described in Example 5.

As noted above, the present invention has been made possible in part, by the inventors' discovery that it is possible to prepare, by extrusion, food polymer-based matrices which contain at least two food polymers, with a minimum of 10% of the total weight of the combined polymers, based on the weight of the matrix ingredients, of food polymer in the matrix composition, which have a minimum of one glass transition ($T_g$) sufficiently high such that the glassy matrix is stable at ambient temperatures, with the use of aqueous plasticizer. The inventors have also discovered that with the use of an aqueous plasticizer it is possible to prepare a matrix containing 15 to 100% by weight of a ternary combination of food polymers which do not undergo plastic flow or caking at ambient temperatures. This discovery is a surprising result considering the well-known large glass-transition-lowering effect of water in carbohydrate and protein based systems. In addition, it was surprisingly found by the inventors that the selected food polymers which normally exhibit extremely large viscosities at low levels in the hydrated state can be melted and exhibit plastic flow compatible with the extrusion process to yield a matrix which rapidly solidifies and sets into the desirable glassy state. The choice and function of the food polymers must be carefully balanced in terms of composition, type and use levels. The adjustment of desirable plastic flow properties can be managed in part by the use of additional plasticizers such as glycerine, propylene glycol in addition to primary plasticizer: water.

Thus, in a first embodiment, the present invention provides encapsulation compositions in which (A) an encapsulate is encapsulated in (B) a glassy matrix which is selected from the group consisting of:

(a) a composition, comprising:
($a_1$) 5 to 95% by weight, based on the total weight of said composition (a), of a first n-octenylsuccinic anhydride-modified starch; and
($a_2$) 5 to 90% by weight, based on the total weight of said composition (a), of a second n-octenylsuccinic anhydride-modified starch; and
($a_3$) 0 to 45% by weight, based on the total weight of said composition (a), of a component selected from the group consisting of sugars, polyols, corn syrup solids, and mixtures thereof, with the proviso that said first n-octenylsuccinic anhydride-modified starch and said second n-octenylsuccinic anhydride-modified starch are different from each other;

(b) a composition, comprising:
($b_1$) 5 to 95% by weight, based on the total weight of said composition (b), of a first food polymer;
($b_2$) 5 to 90% by weight, based on the total weight of said composition (b), of a second food polymer; and
($b_3$) 0 to 45% by weight, based on the total weight of said composition (b), of a component selected from the group consisting of sugars, polyols, corn syrup solids, and mixtures thereof, wherein said first food polymer is an n-octenylsuccinic anhydride-modified starch, and wherein said second food polymer is selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan;

(c) a composition, comprising:
($c_1$) 5 to 95% by weight, based on the total weight of said composition (c), of a first food polymer;
($c_2$) 5 to 90% by weight, based on the total weight of said composition (c), of a second food polymer; and
($C_3$) 0 to 45% by weight, based on the total weight of said composition (c), of a component selected from the group consisting of sugars, polyols, corn syrup solids, and mixtures thereof, wherein said first food polymer and said second food polymer are selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, and with the proviso that said first food polymer and said second food polymer are different from each other; and (d) a composition, comprising:
($d_1$) 5 to 95% by weight, based on the total weight of said composition (d), of a first food polymer;
($d_2$) 5 to 70% by weight, based on the total weight of said composition (d), of a second food polymer;
($d_3$) 5 to 70% by weight, based on the total weight of said composition (d), of a third food polymer; and
($d_4$) 0 to 45% by weight, based on the total weight of said composition (d), of a component selected from the group consisting of sugars, polyols, corn syrup solids, and mixtures thereof, wherein said first food polymer and said second food polymer are selected from the group consisting of exudate gums, bacterial gums, extract gums, seed gums, pectins, dextrins, maltodextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, and wherein said third food polymer is selected from the group consisting of n-octenylsuccinic anhydride-modified starches, exudate gums, bacterial gums, extract gums, seed gums, pectins, dextrins, pregelatinized starches, agar agar, polydextrose, hydrogenated starch hydrolyzates, modified celluloses, seaweed hydrocolloid extracts, proteins, fractionated proteins, hydrolyzed proteins, and chitosan, with the proviso that said first food polymer, said second food polymer, and said third food polymer are all different from each other.

Thus, each of matrix compositions (a), (b), (c), and (d) is characterized by the inclusion of at least two different food polymers.

In a preferred embodiment, matrix composition (a) comprises 10 to 75% by weight, more preferably 30 to 75% by weight, based on the total weight of said composition (a), of said first n-octenylsuccinic anhydride-modified starch; 10 to 70% by weight, more preferably 20 to 50% by weight, based on the total weight of said composition (a), of said second n-octenylsuccinic anhydride-modified starch; and 1 to 45% by weight, more preferably 10 to 40% by weight, based on the total weight of said composition (a), of said component selected from the group consisting of sugars, polyols, corn syrup solids, and mixtures thereof.

In another preferred embodiment, matrix composition (b) comprises 10 to 75% by weight, more preferably 30 to 75% by weight, based on the total weight of said composition (b), of said first food polymer; 10 to 70% by weight, more preferably 20 to 50% by weight, based on the total weight of said composition (b), of said second food polymer; and 1 to 45% by weight, more preferably 10 to 40% by weight, based on the total weight of said composition (b), of said component selected from the group consisting of sugars, polyols, corn syrup solids, and mixtures thereof.

In another preferred embodiment, matrix composition (c) comprises 10 to 75% by weight, more preferably 30 to 75% by weight, based on the total weight of said composition (c), of said first food polymer; 10 to 70% by weight, more preferably 20 to 50% by weight, based on the total weight of said composition (c), of said second food polymer; and 1 to 45% by weight, more preferably 10 to 40% by weight, based on the total weight of said composition (c), of said component selected from the group consisting of sugars, polyols, corn syrup solids, and mixtures thereof.

In another preferred embodiment, matrix composition (d) comprises 10 to 75% by weight, more preferably 30 to 75% by weight, based on the total weight of said composition (d), of said first food polymer; 10 to 60% by weight, more preferably 20 to 50% by weight, based on the total weight of said composition (d), of said second food polymer; 10 to 60% by weight, more preferably 20 to 50% by weight, based on the total weight of said composition (d), of said third food polymer; and 1 to 45% by weight, more preferably 10 to 30% by weight, based on the total weight of said composition (d), of said component selected from the group consisting of sugars, polyols, corn syrup solids, and mixtures thereof.

Thus, when the matrix is composition (a), then both the first and second food polymers are an n-octenylsuccinic anhydride-modified starches (OSAN-modified-starch) including the dextrinized, acid or enzymatically hydrolyzed forms of modified starch, provided that the first and second food polymers are not the same.

When the matrix is composition (b), then the first food polymer is an OSAN-modified-starch, and the second food polymer is selected from the group consisting of exudate gums (arabic, ghatti, karaya, tragacanth), extract gums (β-glucans, inulins, konjac, larch), seed gums (locust bean, guar, pysllium, quince, fenugreek, tara), pectins (high methoxy-, low methoxy-, amidated), microbial gums (xanthan, curdlan, pullulan, gellan, scleroglucan, welan, rhamsan), modified celluloses (methylcellulose, hydroxypropylcellulose, hydroxypropylmethyl cellulose, sodium carboxymethyl cellulose), seaweed hydrocolloid extracts (sodium alginate, propyleneglycol alginate, ammonium alginate, alginic acid, carageenans (iota, ι, kappa, κ, lambda, λ)), dextrins, dextran, hydrogenated starch hydrolyzates, polydextrose, agar agar, gelatins (both type A and B, hydrolyzed gelatin), milk proteins (whole milk protein, sodium caseinate, calcium caseinate, whey proteins, albumins, lactoglobulins), pregelatinized starches, seed proteins (from soy, sunflower, cottonseed, peanut), cereal proteins (wheat, corn, oat, rice), fractionated proteins, hydrolyzed proteins and chitosan.

When the matrix is composition (c), both the first and second food polymers are the same as the second food polymer as defined for matrix (b), provided that the first and second food polymers are not the same.

When the matrix is composition (d), the first and second food polymers are the same as the first and second food polymers as defined for matrix (c), and the third food polymer is selected from the group consisting of OSAN-modified starches, exudate gums (arabic, ghatti, karaya, tragacanth), extract gums (β-glucans, inulins, konjac, larch), seed gums (locust bean, guar, psyllium, quince, fenugreek, tara), pectins (high methoxy-, low methoxy-, amidated), microbial gums (xanthan, curdlan, pullulan, gellan, scleroglucan, welan, rhamsan), modified celluloses (methylcellulose, hydroxypropylcellulose, hydroxypropylmethyl cellulose, sodium carboxymethyl cellulose), seaweed hydrocolloid extracts (sodium alginate, propyleneglycol alginate, ammonium alginate, alginic acid, carageenans (iota, ι, kappa, κ, lambda, λ)), dextrins, dextran, hydrogenated starch hydrolyzates, polydextrose, agar agar, gelatins (both type A and B, hydrolyzed gelatin), milk proteins (whole milk protein, sodium caseinate, calcium caseinate, whey proteins, albumins, lactoglobulins), pregelatinized starches, seed proteins (from soy, sunflower, cottonseed, peanut), cereal proteins (wheat, corn, oat, rice), fractionated proteins, hydrolyzed proteins and chitosan, provided that the first, second, and third food polymers are not the same.

Suitable OSAN-modified starches and other food polymers are described in more detail immediately below.

The modified starches consist of a group n-octenylsuccinic anhydride modified starches (OSAN-starch). The starches may be concomitantly modified by dextrinization and chemically derivatized with n-octenylsuccinic anhydride. Alternatively, the starch may undergo initial chemical or enzymatic hydrolysis followed by derivatization with n-octenylsuccinic anhydride. Examples of such modified OSAN-starches are sold under the trade names: Capsul, Amiogum, Hi-Cap 100, Emcap 12634, Emcap 12639, Miracap, and National 780487 among others.

Dextrins, incompletely hydrolyzed starch polymers, are prepared by dry heating corn, waxy maize, waxy milo, potato, arrowhead, wheat, rice, tapicoa or sago starch. Alternatively, the dextrins can be obtained treating the selected dry starch with suitable acid, alkalai or pH control agents and then heating and drying.

Maltodextrins are also suitable carbohydrate food polymers. These polymers are derived from the partial hydrolyzed forms of corn, rice, wheat, or potato starches utilizing suitable acid or enzymatic catalysis. The maltodextrins are defined as having a Dextrose Equivalent (D.E.) of <20. The most suitable maltodextrins are the 10 D.E. maltodextrins.

Hydrogenated starch hydrolyzates are the products obtained from the hydrolysis of a starch to generate maltodextrin oligomers. These oligomers are then hydrogenated to convert the terminal reducing sugar moiety to an oligomer with a non-reducing terminal polyol.

Polydextrose is the glucosyl homopolymer resulting from the condensation of glucose in the presence of an acidic catalyst.

Specifically the protein polymers utilized may be selected from the group of gelatins (both from acidic or basic extraction sources, hydrolyzed gelatins); milk proteins (whole milk protein, sodium caseinate, calcium caseinate, whey proteins, albumins, globulins), seed proteins (from soy, sunflower, cottonseed, peanut, rape); cereal proteins (wheat, corn, oat, rice), fractionated proteins, hydrolyzed proteins, and egg proteins.

Gelatin, the soluble protein extract from collagen, comes from various animal sources and in different forms. There are acid-extracted and base-extracted forms of gelatin. The key difference of the two forms being in the isoelectric point of the resultant, soluble polymer. Sources of the collagen used for extraction to generate the gelatin include cattle hides and pork skins. The type and degree of extraction lead to various grades of gelatin. Acid hydrolysis of the collagen leads to Type A acid gelatin. Similarly base hydrolysis and extraction leads to a Type B gelatin. The isoelectric points are generally in the pH range of 7 to 9 for Type A; and 4.7 to 5.1, for Type B. Gelatins are generally characterized by their gelling strength in terms of Bloom using a standardized procedure and a Bloom gelometer. Commercial gelatins vary from 50 to 300 Bloom with the high values indicating stronger gels (see M. Glicksman, *Gum Technology in the Food Industry*, Academic Press, pp. 359-397, 1969). The particular gelatins which are most compatible with the extrusion encapsulation process of the present invention are the 50 to 75 Bloom gelatins of both type A and B.

Another form of gelatin is the hydrolyzed gelatins. These products are derived from the standard gelatins by an additional hydrolysis step. The result is a hydrolyzed, water soluble, non-gelling form of the food protein. Generally, molecular weights of the hydrolyzed gelatins are in the range from 10,000 to 100,000. Amidated gelatins may also be used.

Other hydrocolloid polymers include the exudate gums, gum extracts and microbial gums.

Gum arabic is an exudate gum obtained from Acacia trees. The main species are *Acacia senegal* and *Acacia seyal*. Gum arabic is a branched molecule with a main chain of (1→3)-linked-β-D-galactopyranosyl units having side chains, consisting of (1→3)-linked β-D-galactopyranosyl units, joined to it by (1→6)-linkages. The resulting side chains consist of various acidic sugars (see *Industrial Gums*, R. Whistler and J. BeMiller, Eds., 3rd Edition, Academic Press, pp. 311-318, 1993). The hydrocolloid shows enhanced solubility and relatively low viscosities in solutions of 30 to 40 wt. % solids. Generally, the *A. Senegal* gum is used to make beverage emulsions, while the *A. seyal* gum is used for spray drying applications. In spray drying, the key functional characteristics of the polymer are its emulsifying capacity, good film-forming properties upon drying and reasonably low aqueous viscosity. One key commercial specification for the *A. seyal* product is the degree of color contributed by the gum. With some darker lots of the gum, a bleaching step is sometimes added to lighten the product color by oxidation. Unexpectedly it was discovered by the present inventors that unbleached *A. seyal* or *A. senegal* can be extruded in a manner which protects the freshly extruded molten extrudate from flashing off flavor volatiles.

Other exudates gums include gum karaya, also known as *sterculia* gum, which comes from the tree *Sterculia urens*. This complex polysaccharide has a molecular weight as high as 9,500,000. Gum tragacanth is obtained from shrubs of the *Astragalus* species. Gum ghatti, the translucent exudate from *Anogeissus latifolia* tree, is a complex polysaccharide that hydrates in cold water, producing a translucent gel. It is also known as 'Indian gum.'

Among the seed gum extracts is guar gum which is derived from the bean plant *Cyamopsis tetragonolobus*. This long-chain, linear molecule of β-1,4-D-galactomannans with α-1,6-linked D-galactose has a molecular weight of approximately 1,000,000. Locust bean gum, from *Ceratonia siliqua*, is a branched β-1,4-D-galactomannan with a high molecular weight. Konjac, a β-1,4-glucomannan, is derived from the roots of the elephant yam (*Amorphophallus konjac*). It has a molecular weight of 200,000 to 2,000,000. Tara gum, derived from the tara bush, *Caesalpinia spinosa*, is a galactomannan that structurally resembles guar and locust bean gums. Larch gum or arabinogalactan is the hydrocolloid extracted from the American Larch. The arabinogalactan is composed of galactose and arabinose units in a 6:1 ratio, with a trace of uronic acid. The molecular weights of the major fractions of arabinogalactan in larch gum are 16,000 and 100,000. Glycosyl linkage analysis of arabinogalactan is consistent with a highly branched structure comprising a backbone of 1,3-linked galactopyranose connected by 1,3-glycosidic linkages.

A number of hydrocolloid gums are available from the action of microbial fermentation on sugars and carbohydates. These include: xanthan gum which is a polysaccharide produced by *Xanthomonas campestris* bacteria. Gellan gum is a gel-forming polysaccharide derived from *Pseudomonas elodea*. Pullulan is a natural polysaccharide produced from starch by a yeast called *Aureobasidium pullulans*. Curdlan is a β-1,3-glucan produced by the microorganism *Alcaligenes faecalis* var.

Cellulose is the most common carbohydrate polysaccharide consisting of glucose molecules linked by β-1,4 linkages, and is the starting material for cellulosic gums. Microcrystalline cellulose (MCC) provides a high degree of thixotropy, which results from the large number of colloidal microcrystalline particles formed by hydrolyzing cellulose. Carboxymethylcellulose (CMC) gum, or cellulose gum, is a sodium salt derived from purified, modified cellulose.

Methylcellulose (MC), hydroxypropyl methylcellulose (HPMC), and hydroxypropyl cellulose (HPC) are cellulosic gums with methyl ether and/or hydroxypropyl derivatizing groups. The methylcellulose food polymers are a class of various substituted celluloses. A detailed characterization can be found in the 'Methocel Cellulose Ethers' Technical Handbook supplied the Dow Chemical Company. The molecular weight of a cellulose ether, such as methyl cellulose or hydroxypropyl methyl cellulose, is generally expressed in terms of the viscosity at 20° C. of an aqueous solution containing 2 wt. % of the cellulose ether. Suitable cellulose ethers for use are those having a viscosity of 3 to 100,000 centipoises, preferably 15 to 2,000 centipoises. Cellulose ethers are also characterized in terms of the degree of hydroxypropoxyl and methoxyl substitution. The term "methoxy degree of substitution" (MDS) refers to the average number of methyl ether groups present per anhydroglucose unit of the cellulose molecule. The term "hydroxypropyl molar substitution" (HPMS) refers to the average number of moles of propylene oxide which are reacted with each anhydroglucose unit of the cellulose molecule. In the present invention, the methyl cellulose suitably has a MDS of from 19 to 31, preferably 27 to 31. The hydroxypropyl methyl cellulose suitably has a MDS of from 19 to 30, preferably 24 to 30, and a HPMS of from 4 to 12, preferably 7 to 12. These polymers are unique in that when in a hydrated state they are reversible thermal gelling polymers. In the context of the present invention, these polymers are placed in a low moisture, melt environment of an extruder. Under these processing conditions, plasticizers and cosolvents may assist in the melt process. It is also noted that these modified celluloses may past through the high temperature, low moisture extrusion process only partially plasticized or unplasticized. This property of limited polymer solubility in the melt extrusion process can yield beneficial properties to the present compositions. The presence of unhydrated methylcellulose particles distributed throughout the extruded glassy matrix can ultimately lead to retarded hydration by water in the application, protection of the matrix, and retarded release of encapsulated encapsulant.

CMC cellulose is prepared by the chemical reaction of sodium monochloroacetate with an alkalai cellulose. The product consists of a sodium carboxymethyl groups on the hydroxy groups of the cellulose. The degree of substitution of the side groups is approximately 0.7 for food grade products. The hydrated polymer can be defined by viscosity types (high, medium, and low) which correspond to approximate polymer molecular weights of 700,000, 250,000 and 90,000 respectively. The CAS number of this material is: 9004-32-4 and the CAS name is: cellulose, carboxymethyl ether, sodium salt.

Pectin is a cell wall polysaccharide that is commercially extracted from citrus peels and apple pomace. It consists mainly of galacturonic acid and galacturonic acid methyl ester units that form linear chains. It is normally classified according to its degree of esterification—a pectin with at least 50% DE (degree of esterfication) or greater is a high-methoxy (HM) pectin, while one below a DE of 50% is a low-methoxy (LM) pectin. The two types possess different properties; for example, low-methoxy pectin requires calcium to gel. Amidated pectins (both calcium and non-calcium senstivy forms) may also be used.

Another group of food polymers are derived from seaweed: agar agar, the alginates and the carageenans, and are useful in the present invention. The carageenan polymers are sulfate-bearing heteropolymers derived from various species of seaweeds. Carrageenans are linear sulfated galactans obtained from red seaweeds (Rhodophyceae), but since the carrageenan molecule has up to 1,000 galactose residues, it has many structures. They are generally characterized as having the kappa, lambda and iota forms and show various sensitivity to calcium and potassium in terms of gelling in the hydrated state.

Alginates are extracted from brown seaweed or kelp. The polymer extract from the specific seaweed sources yields the alginic acid form, the sodium alginate form and a chemically modified alginate: the propyleneglycol alginates. Alginate is made up of the five-carbon polymers mannuronic acid and gluronic acid. In the presence of calcium ions, it forms thermally irreversible gels.

Agar-agar is a polysaccharide derived from various species of red algae such as *Sphaerococcus, Euchema* and *Gelidium*, and contains sulfated galactose monomers.

Another carbohydrate polymer group consists of the β-glucans and inulins. β-Glucans consist of linear unbranched polysaccharides of linked β-(1→3)- and β-(1→4)-D-glucopyranose units. These polymers are obtained by extraction of oat cell wall. β-Glucans form 'worm'-like cylindrical molecules containing up to about 250,000 glucose residues that may produce cross-links between regular areas containing consecutive cellotriose units. They form thermoreversible infinite network gels. 90% of the β-(1→4)-links are in cellotriosyl and cellotetraosyl units joined by single β-(1→3)-links with no single β-(1→4)- or double β-(1→3)-links. The ratio of cellotriosyl/cellotetraosyl is about 2.0-2.4 in oats, about 3.0 in barley, and about 3.5 in wheat.

Inulin is a fructosyl oligosaccharide polymer and has been extracted from chickory and jerusalem artichokes.

Chitosan is a linear, water-insoluble glycan derived from crustaceans and other sources. It is the deacetylated form of the chitin.

In the use of mixed polymers such as an OSAN-modified starch with a gum, protein or hydrocolloid polymers or mixed polymer formulations, the response of the mixed polymer melt within the extruder must be empirically determined. In some cases the presence of two glass transitions in the resultant glassy solid will be observed. The explanation for the presence of two glass transitions can be developed by one of two possible considerations. In the first case the selected extruded polymers are immiscible in the molten state forming the equivalent of a polymer-in-polymer "emulsion." Alternatively, the two polymers may be miscible but are incompletely solubilized during melting and mixing in the short residence time occurring during the melt extrusion process. There is extremely limited knowledge of this phenomena in the food literature. The interactions of a large number of binary polymer systems in the aqueous-carbohydrate plasticizing environment of the melt extrusion process can only be determined experimentally.

The use of quaternary mixtures of food polymers as pre-reacted components in melt extrusion may have additional benefits and is encompassed by the present compositions and methods.

In the case where the two polymers are selected from a very similar type such as the modified starches the physical characteristics such as melt viscosity, aqueous plasticizer levels, emulsifying properties, and Tg setting properties are relatively compatible within the process dynamic limitations of extrusion internal pressures, internal temperatures and expansion characteristics of the extruded melt. During experimental studies of the OSAN-modified starch: OSAN-modified starch formulas, two glass transitions were observed in certain cases (see FIG. 1). When the same formulas were used to form an emulsion at 40% total solids and spray dried, the resulting matrix showed a single glass transition. It is believed that in the latter case the polymers were totally hydrated (dissolved) and therefore formed a single isotropic polymer phase upon rapid drying.

Figure 2:
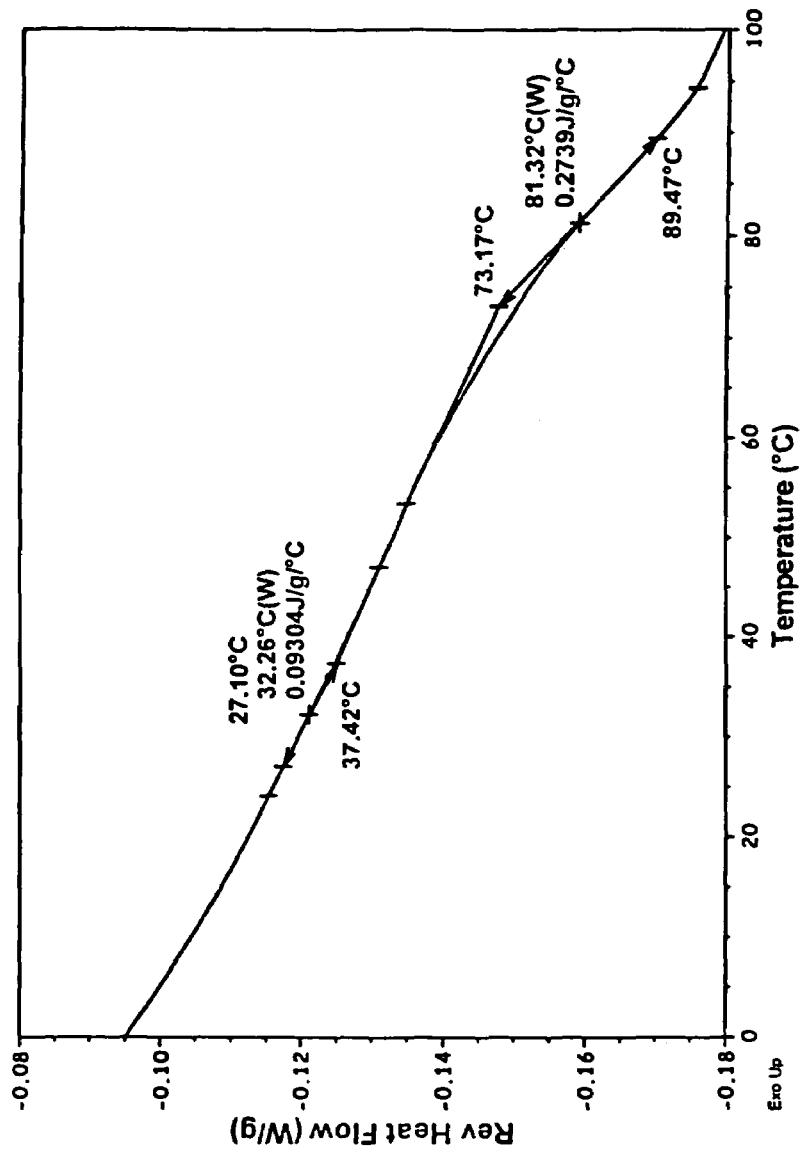
FIG. 2 is a Modulated Differential Scanning Calorimetric (MDSC) plot of a double 'glass transition' obtained from an extruded matrix consisting of an n-octenylsuccinic anhydride-modified starch and a pectin as a binary extruded polymer-polymer matrix as described in Example 2.

In cases where the polymers are chosen from completely different classes, a better explanation for the presence of two Tg's would be the existance of mixed polymer phases. An example of this matrix is given in FIG. 2. Surprisingly, before the present invention, one skilled in the art would not have expected that a stable glassy carbohydrate- or protein-based food polymer could have been practically prepared using an aqueous plasticizer.

The present compositions may also contain 0 to 45% by weight, preferably 1 to 45% by weight, more preferably 5 to 25% by weight, based on the total weight of the matrix composition, of a component selected from the group consisting of sugars, polyols, corn syrup solids, and mixtures thereof. Examples of suitable sugars include mono- and disaccharides (including glucose, sucrose, maltose, fructose, galactose, ribose, xylose, lactose, cellobiose, trehalose), invert syrups, molasses, and corn syrups. The preferred sugars are glucose and maltose.

Polyols are a group of lower molecular weight ingredients mostly as polyhydric agents. Simpler polyols include glycerine, and propylene glycol. Examples of other polyols include erythritol, lactitol, mannitol, sorbitol, maltitol, isomalt, dulcitol, xylitol, hydrogenated corn syrups, hydrogenated glucose syrups, hydrogenated maltose syrups, and hydrogenated lactose syrups. The preferred polyols are mannitol, sorbitol, and isomalt. Suitable corn syrup solids are the 36 to 42 D.E. corn syrup solids.

The term encapsulate as used in the present invention, includes agents such as medications, pesticides, preservatives, vitamins, food acids, salts, flavoring agents, perfumery chemicals and fragrances, and food colorants both synthetic and natural. Suitable medications include antacids, anti-inflammatory substances, coronary vasodilators, cerebral vasodilators, peripheral vasodilators, anti-infectives, psychotropics, anti-manics, stimulants, antihistamines, laxatives, decongestants, vitamins, gastrointestinal sedatives, antidiarrheal preparations, antianginal drugs, antiarrhythmics, antihypertensive drugs, vasoconstrictors, migraine treatments, anticoagulants, antithrombotic drugs, analgesics, antipyretics, hypnotics, sedatives, antiemetics, antinauseants, anticonvulsants, thyroid and antithyroid preparations, diuretics, antispasmodics, uterine relaxants, mineral and nutritional additives, antiobesity drugs, anabolic drugs, erythropoietic drugs, antiasthmatics, expectorants, cough suppressants, mucolytics, antiuricemic drugs, and other drug substances such as topical analgesics, local anesthetics and the like.

Suitable pesticides include insecticides, nematocides, fungicides, herbicides, and microbicides. Insecticides, which may be encapsulated in the present compositions include those disclosed in *Kirk-Othmer, Encyclopedia of Chemical Technology*, 4th Ed., vol. 14, Wiley, New York, pp. 524-602, 1995, and 3rd Ed., vol. 13, pp. 313-485, 1981, both of which are incorporated herein by reference. Suitable nematocides include, e.g., methyl N'N'-dimethyl-N-[(methylcarbamox) oxy]-1-thiooxamimidate (oxamyl) and those disclosed in *Kirk-Othmer, Encyclopedia of Chemical Technology*, 4th Ed., vol. 24, Wiley, New York, pp. 830-831, 1997, and 3rd Ed., vol. 18, pp. 305-308, 1982, both of which are incorporated herein by reference. Suitable fungicides include those disclosed in *Kirk-Othmer, Encyclopedia of Chemical Technology*, 4th Ed., vol. 12, Wiley, New York, pp. 204-227, 1994, and 3rd Ed., vol. 11, pp. 490-498, 1980, both of which are incorporated herein by reference. Suitable herbicides include those disclosed in *Kirk-Othmer, Encyclopedia of Chemical Technology*, 4th Ed., vol. 13, Wiley, New York, pp. 73-136, 1995, and 3rd Ed., vol. 12, pp. 297-351, 1980, both of which are incorporated herein by reference. Suitable antibiotics and antimicrobials include those disclosed in *Kirk-Othmer, Encyclopedia of Chemical Technology*, 4th Ed., vol. 2, Wiley, New York, pp. 854-1018, 1992, and vol. 3, pp. 1-346, 1992, both of which are incorporated herein by reference. Suitable vitamins include those disclosed in *Kirk-Othmer, Encyclopedia of Chemical Technology*, 4th Ed., vol. 25, Wiley, New York, pp. 1-17, 1998, and 3rd Ed., vol. 24, pp. 1-277, 1984, both of which are incorporated herein by reference. Suitable food additives, in addition to flavoring agents, include those disclosed in *Kirk-Othmer, Encyclopedia of Chemical Technology*, 4th Ed., vol. 11, Wiley, New York, pp. 805-833, 1994, and 3rd Ed., vol. 11, pp. 146-163, 1980, both of which are incorporated herein by reference.

The term flavoring agent includes spice oleoresins and oils derived from allspice, basil, capsicum, cinnamon, cloves, cumin, dill, garlic, marjoram, nutmeg, paprika, black pepper, rosemary and turmeric; essential oils: anise oil, caraway oil, clove oil, eucalyptus oil, fennel oil, garlic oil, ginger oil, peppermint oil, onion oil, pepper oil, rosemary oil, and spearmint oil; citrus oils such as orange oil, lemon oil, bitter orange oil and tangerine oil; alliaceous flavors: garlic, leek, chive, and onion; botanical extracts: arnica flower extract, chamomile flower extract, hops extract, and marigold extract; botanical flavor extracts: blackberry, chicory root, cocoa, coffee, kola, licorice root, rose hips, sassaparilla root, sassafras bark, tamarind and vanilla extracts; protein hydrolysates: hydrolyzed vegetable protein (HVPs), meat protein hydrolysates, milk protein hydrolysates; and compounded flavors both natural and artificial including those disclosed in S. Heath, *Source Book of Flavors*, Avi Publishing Co. Westport, Conn., pp. 149-277, 1981, which is incorporated herein by reference. Representative flavor compounds are for example: benzaldehyde, diacetyl (2,2-butanedione), vanillin, ethyl vanillin and citral (3,7-dimethyl-2,6-octadienal). The flavoring agent may be in the form of an oil, aqueous solution, non-aqueous solution or an emulsion. Flavor essences, i.e., the water-soluble fraction derived from fruit or citrus can be utilized although at lower levels than the ingredients referenced above. As will be described more fully below, the present invention is particularly advantageous when the flavoring agent is itself a volatile compounds with varying vapor pressures at ambient conditions.

Although the exact amount of encapsulate encapsulated in the matrix will depend, in part, upon the precise nature of the matrix, and the anticipated end use of final composition, the encapsulation compositions of the present invention will typically comprise 4 to 18% by weight, based on the total weight of the composition, of encapsulate. Preferably, the present encapsulation compositions will comprise 8 to 12% by weight, based on the total weight of the composition, of encapsulate. It is preferred that the encapsulate be a flavoring agent.

When the encapsulate is lipophilic, the encapsulate is dispersed in the glassy matrix of the final product usually with the aid of an emulsifier added to the lipophilic phase or in the matrix mixture. Emulsifiers such as distilled monoglycerides, ethoxylated monoglycerides, lacylated monoglycerides, acetylated monoglycerides, diacetyl tartarate esters of monoglycerides (D.A.T.E.M.'s), propyleneglycol monoesters, sorbitan monostearate, sorbitan tristearate, polyglycerol esters, sorbitan polyoxyethylene monoester and triesters, sucrose esters, sodium stearoyl lactylate (S.S.L.), lecithin, hydroxylated lecithin, oleyl lactylic acid, lactylated esters of monoglycerides, lactylated fatty acid esters of glycerol and propylene glycol, and lactylated esters of propylene glycol monoglycerides, and the sodium and potassium salts of fatty acids can be employed singly or in combination. The emulsifier(s) is used at the level of 0.1 to 10% of the selected flavor. Preferred emulsifiers are the sorbitan polyoxyethylene monoesters.

In addition to the foregoing encapsulates, various optional ingredients such as conventionally used in the art, may be included in the compositions of the present invention. For example, colorings, sweeteners, food acids, salts, fragrances, diluents, flavor maskers, flavor enhancers, fillers, preservatives, anti-oxidants, stabilizers, lubricants, and the like may be employed herein if desired.

The present encapsulation compositions may be prepared by either spray drying or melt extrusion. In a preferred embodiment, the present encapsulation compositions are prepared by melt extrusion.

Thus, in another embodiment, the present invention provides a process for preparing the present encapsulation compositions, which comprises:

(i) mixing a matrix composition (B) with a liquid plasticizer and an encapsulate (A) in an extruder, to obtain a melted mixture comprising encapsulate (A) and matrix composition (B); and (ii) extruding said melted mixture.

In the present process, the liquid plasticizer may be any which is suitable for facilitating the formation of the melt in the extruder while at the same time affording a product which exists in the glassy state, rather than the plastic or rubbery state at room temperature. Suitable plasticizers include water; glycerol; propylene glycol; aqueous solutions of glycerol, propylene glycol, monosaccharides, and disaccharides; and invert and high fructose corn syrups. When the encapsulate is a flavor and the final product is intended to be used as a food additive, the plasticizer should be a food grade solvent. In one preferred embodiment, the present compositions are prepared by utilizing water as the liquid plasticizer.

The plasticizer is added in an amount which results in the formation of a melt in the extruder, while at the same time affording a product which exists in the glassy state at room temperature. Thus, the amount of the plasticizer added may be selected to afford a product which has a Tg of at least 30° C., preferably at least 35° C., more preferably at least 40° C.

Suitable carbohydrates which are utilized as the non-polymeric component in the formulas and which function in a concomitant fashion as a plasticizer include mono- and disaccharides, trehalose, invert syrups, molasses, corn syrups, and 36 to 42 D.E. corn syrup solids. Suitable polyols are erythritol, sorbitol, mannitol, lactitol, maltitol, isomalt, dulcitol, xylitol, hydrogenated corn syrups, hydrogenated glucose syrups, hydrogenated maltose syrups, and hydrogenated lactose syrups. The preferred carbohydrates are glucose and maltose, and the preferred polyols are mannitol, sorbitol, and isomalt.

The matrix (B), along with the plasticizer forms a melt in the extruder. Although the mixing action of the extruder will supply heat to the matrix/plasticizer mixture, it will typically be necessary to supply additional heat to ensure formation of the melt. The encapsulate (A) is continuously added in a liquid phase to the feeding zone of the extruder by injection and mixed with the melted matrix/plasticizer mixture before exiting the extruder. In some embodiments, it may be preferred to add a non-aqueous, liquid plasticizer to the encapsulate phase.

In certain embodiments, a surface-active agent, i.e., an emulsifier can be added to the dry blend, or preferably added to the liquid flavor mix which is ultimately injected into the melting zone of the extruder. These emulsifiers can be from the class of distilled monoglycerides, mono- and diglyceride blends, propyleneglycol monoglycerides, lecithin, modified lecithins, acetylated monoglycerides, lactylated monoglycerides, lactylated fatty acid esters of glycerol and propylene glycol, and lactylated propyleneglycol monoglycerides, sorbitan esters, sorbitan-polyoxyethylene [20] monoglycerides, polyglycerol esters, DATEM's (diacetyltartarate esters of monoglycerides), succinylated esters of monoglycerides and polyoxyethylenepropylene copolymers, ethylene oxide-propylene oxide copolymers (Pluronics) and mixtures thereof. The most preferred surfactants are the sorbitan-polyoxyethylene [20] monoglycerides.

Preferred flavorants may be compounded flavors, essential oils, citrus oils, fruit extracts and essences, oleoresins and other forms. In some cases, the flavors can be diluted in a series of flavor solvents. These include fractionated coconut oils (medium chain triglycerides), propyleneglycol, glycerol, triacetin (glycerol triacetate) among others.

In a preferred embodiment, a twin screw extruder is used.

When the encapsulation composition exits the extruder, it may be cooled by remaining in ambient temperature air, or in chilled or sub-ambient temperature air, or by passing through a liquid bath, with or without temperature control. Although not necessary, the cooled product may be further processed by size reduction, for example by grinding or pulverizing. The product may also be treated with an anti-agglomeration compound either before or after size reduction.

It is known in the polymer and plastics industry that polymer melts can be co-soluble, or alternatively, form separate incompatible phases during melt extrusion. In aqueous concentrated solutions, thermodynamic incompatibility or limited co-solubility of biopolymers is a well-known phenomenon affecting structure and key functional properties of their solutions. For an aqueous solution of a pair of water-soluble biopolymers the region of co-solubility, corresponding to a relatively low concentration of both polymers, would be a single-phase, transparent solution. Above this concentration, the system will form two layers (phases) with a predominant concentration of one of the biopolymers in one of the phases. Extensive mixing of the two-phase solution would lead to an aqueous polymer-aqueous polymer type of emulsion. This simple scenario does not assume formation of any soluble or insoluble complexes between biopolymers when structure of the solution will be more complex. Numerous publications describe behavior of biopolymers in solutions and gels, however experimental data in this area is limited or non-existent for compatibility of food biopolymers in a melt.

A major issue is that the high temperatures (above water boiling point) typically needed to form a biopolymer melt at low water content and high melt viscosity may prevent equilibrium separation of phases. A multiphase structure of composite biopolymer melts based on soy protein and maltodextrin or other gums has been observed with optical microscopy, SEM, X-ray and near-IR spectroscopy (see Yuryev, V. P., Zasypkin, D. V., Ghenin, Ya. V., Zhukov, V. A., Alexeyev, V. V. & Tolstoguzov, V. B., "Role of maltodextrin in promoting structure formation in extruded soya isolate," *Carbohydrate Polymers*, vol. 15, pp. 243-253 (1991)).

Composite materials have been produced by thermoplastic extrusion, by using a cooling die to suppress melt expansion and changes in structure. It was inferred that the multiphase structure resulted from incompatibility or/and kinetics of mixing of biopolymers in the melt (see Zasypkin, D. V., Yuryev V. P., Alexeev, V. V. & Tolstoguzov, V. B., *Carbohydrate Polymers*, vol. 18, pp. 119-124 (1992)).

Limited co-solubility of biopolymers and multiphase structure of the blends can be expected to have a profound effect on flavor encapsulation in such mixed systems. In a general case, one polymer having a stronger affinity to a flavor and carrying most of it can be encapsulated in the continuous phase formed by the second polymer. It appears that co-melting of mixed polymers with the addition of the carbohydrate plasticizer can be achieved by the procedure of the present invention.

The formulation of multiple polymers offers several options with their use. In the first case a simple dry blending of polymer-1, polymer-2 (and optional polymer-3) yields a composite dry blend (with the optional carbohydrates) which is then fed into the extruder as described in the examples. However combinations of certain polymers, especially when hydrated, show specific phase interactions. For example a gelatin will form a complex coacervate at specific concentrations with specific anionic polymers (e.g. gum arabic or C.M.C.) at selected pH's and concentrations. After formation, this hydrated polymer-rich (coacervate) phase could be decanted, and co-dried to produce a dry intermediate with more strongly interacted polymer chains. This coacervated 'concentrate' in the form of a dry polymer complex could yield a polymer ingredient with potentially unique melt properties over the individual, dry composite blend. For the purposes of the present invention, any mixed polymer system prepared by fully hydrating said polymers to form gels, coacervates, solutions or polymer-polymer mixed emulsions (optionally separating polymer rich aqueous phases) and drying to obtain dry intermediates of mixed polymer may be used as the matrix composition. In a very similar manner, a binary aqueous polymer solution such as hydroxypropyl methylcellulose-maltodextrin can result in a polymer-rich and polymer-poor aqueous phase. Drying of such a mixed system will lead to two polymer domains. Use of this (dried) polymer-polymer ingredient might be expected to result in novel physical properties in the present compositions.

In the extrusion process, the matrix mixture contains lower molecular weight components. For the gelatin and hydrolyzed gelatin systems, polyols are preferred to avoid the Maillard browning reactions which result from the reaction of the side chain amino acids and reducing sugars. For the non-protein food polymers, the choice of low molecular weight carbohydrate is determined by the melt dynamics of the extruder. In certain cases, the monosaccharides and disaccharides can be in the form of crystalline hydrates. For glucose monohydrate, the water contribution is 10% by weight of the crystalline sugar. For maltose or lactose monohydrate, that contribution falls to 5 wt. % added water. In such cases, the water stream added as a plasticizer for the melt will be adjusted to compensate for the internal free water contributed by the "melting" of the water of crystallization.

Due to their low molecular weight, the low molecular weight components are compatible with polymers in solutions and usually equally distributed between the phases in the fully hydrated phase-separated systems. It is expected that these components will be compatible with the thermoplastic polymers and equally distributed in the melt unless there is a specific interaction between a low molecular component and a polymer under low hydration conditions. Another reservation could be a limited mixing time during processing of the highly viscose melts. In this case, even low molecular components can form separated domains that could be at least partially crystalline. Such a morphology could affect release properties of the multicomponent systems.

Other features of the invention will become apparent in the course of the following descriptions of exemplary embodiments which are given for illustration of the invention and are not intended to be limiting thereof.

EXAMPLES

Examples 1-5

Materials and Methods

Melt extrusion was accomplished utilizing a laboratory 2" co-rotating twin-screw extruder incorporating oil jacket heating, fitted with a liquid injection port in the feeding zone of the unit, and utilizing a 0.031" multi-orifice die. A matrix composition consisting of pre-blended food polymer(s) and carbohydrate was metered into the feed port at a feed rate between 100 to 130 grams/minute of solids; the water (plasticizer) liquid stream was delivered to the feed port by a metering peristaltic pump at approximately 3-8 ml/minute. The jacket temperature was set at 250° F. Liquid flavors were prepared as concentrates: a lipid-based flavor, "lemonade," utilizing a lemon citrus oil base and a compounded peach flavor. In some cases, an emulsifier, such as polysorbate 60 (polyoxyethylene [20] sorbitan monostearate), was added to the flavor at 0.5 to 5% (w/w emulsifier/flavor). After lining out the feed and conveying rates and bringing the unit into a steady-state, the extrudate was air cooled and collected in the form of fine strands which rapidly set into a brittle, glassy solid.

Example 1

A carbohydrate composition consisting of 75 parts OSAN-starch (Miracap, A.E. Staley Company), 20 parts OSAN-starch (Hi-Cap 100, National Starch and Chemical Co.), and 5 parts dextrose monohydrate (Clintose, ADM) was fed at a rate of 114 gm/min into the extruder. Deionized water was metered into the feed port at 8 gram/min. The extruder jacket temperature was maintained at 250° F. A butter flavor containing 5% of Polysorbate 60 emulsifier (polyoxyethylene [20] sorbitan monostearate) was metered into the mix at 13.0 gm/min. The encapsulate composition was extruded through a die without puffing and the resulting solid cooled by a cold airflow to yield a brittle solid in approximately 2 to 3 seconds. The resultant solid was characterized by MDSC (modulating differential scanning calorimetry) as a glass with two Tg transitions: the first exhibited a $Tg_{(1)}$ of 17.7° C. and a $\Delta Cp$ (reversing transition) of 0.06 J/gm/° C. and the second $Tg_{(2)}$ of 39.3° C. and a $\Delta Cp$ (reversing transition) of 0.26 J/gm/° C. The product contained 8.2% by weight of butter flavor and 8.6% moisture (by Karl Fisher analysis).

Example 2

A carbohydrate composition consisting of 60 parts OSAN-starch (Miracap, A.E. Staley Company), 30 parts high methoxy pectin (RS461, Danisco), and 10 parts Dextrose (Clintose, ADM) was fed at a rate of 114 gm/min. Deionized water was metered into the feed port at 3 gram/min. The extruder jacket temperature was maintained at 250° F. A cinnamic aldehyde flavor containing 5% of Polysorbate 60 emulsifier (polyoxyethylene[20] sorbitan monostearate) was metered into the mix at 7.9 gm/min. The encapsulate composition was extruded through a die without puffing and the resulting solid cooled by a cold airflow to yield a brittle solid in approximately 3 seconds. The resultant solid was characterized by MDSC as a glass with two Tg transitions. The $Tg_{(1)}$ was 32.3° F. with a $\Delta Cp$ (reversing transition) of 0.09 J/gm/° C. The $Tg_{(2)}$ was 81.3° F. and the $\Delta Cp$ (reversing transition) was 0.28 J/gm/° C.

Example 3

A carbohydrate composition consisting of 40 parts OSAN-starch (Hi-Cap 100, National Starch Company), 40 parts of a second OSAN-starch (Emcap 12634, Cargill), 10 parts of gum arabic (Spray Gum SB, Colloides Naturels) and 10 parts dextrose (Clintose, ADM) was fed at a rate of 114 gm/min. Deionized water was metered into the feed port at 4 gram/min. The extruder jacket temperature was maintained at 250° F. A butter flavor containing 5% of Polysorbate 60 emulsifier (polyoxyethylene[20] sorbitan monostearate) was metered into the mix at 13.5 gm/min. The encapsulate composition was extruded through a die without puffing and the resulting solid cooled by a cold airflow to yield a brittle solid in approximately 3 seconds. The resultant solid was characterized by MDSC as a glass with a Tg of 53° F. and a $\Delta Cp$ (reversing transition) of 0.09 J/gm/° C.

Example 4

A carbohydrate composition consisting of 50 parts OSAN-starch (Emcap 12634, Cargill), 20 parts white Dextrin (Staydex 90, A.E. Staley Manufacuring Co.) 30 parts lactose monohydrate (Davisco) was fed at a rate of 114 gm/min into the extruder. Deionized water was metered into the feed port at 5 gram/min. The extruder jacket temperature was maintained at 250° F. A lemonade flavor containing 5% of polysorbate 60 emulsifier (polyoxyethylene[20] sorbitan monostearate) was metered into the mix at 13.4 gm/min. The encapsulate composition was extruded through a die without puffing and the resulting solid cooled by a cold airflow to yield a brittle solid in approximately 2 to 3 seconds. The resultant solid was characterized by MDSC as a glass with two Tg transitions: the first exhibited a $Tg_{(1)}$ of 26.5° C. and a ΔCp (reversing transition) of 0.09 J/gm/° C. and the second $Tg_{(2)}$ of 50.6° C. and a ΔCp (reversing transition) of 0.14 J/gm/° C.

Example 5

A carbohydrate composition consisting of 10 parts OSAN-starch (Hi-Cap 100, National Starch Company), 50 parts of a second OSAN-starch (Emcap 12634, Cargill), 35 parts lactose monohydrate (Davisco) and 5 parts dextrose (Clintose, ADM) was fed at a rate of 114 gm/min. Deionized water was metered into the feed port at 5 gram/min. The extruder jacket temperature was maintained at 250° F. A butter flavor containing 5% Polysorbate 60 emulsifier (polyoxyethylene[20] sorbitan monostearate) was metered into the mix at 16.1 gm/min. The encapsulate composition was extruded through a die without puffing and the resulting solid cooled by a cold airflow to yield a brittle solid in approximately 2 to 3 seconds. The resultant solid was characterized by MDSC as a glass with two Tg transitions. The first exhibited a $Tg_{(1)}$ of 29.9° C. and a ΔCp (reversing transition) of 0.14 J/gm/° C. and the second $Tg_{(2)}$ of 65.6° C. and a ΔCp (reversing transition) of 0.11 J/gm/° C.

Examples 6-25

Materials and Methods

The following OSAN-modified starches were used. Hi-Cap™ 100 was purchased from National Starch & Chemical Co. (Bridgewater, N.J.), while EmCap™ 12639, and Emcap™ 12634 were purchased from Cerestar USA, Inc. Dextrinized OSAN-starch Miracap® and the dextrin Stadex®90 was supplied by A.E. Staley Manufacturing Co. Lactose (fine grind) was purchased from Davisco Foods International, Inc. (Le Sueur, Minn.), and dextrose (Clintose A) from Archer Daniels Midland Co. (Decatur, Ill.). The ingredients were used without further purification. The matrix compositions noted below were used in these examples:

A: HiCap100: Emcap12639: Lactose=40:30:30% (w/w)
    B: Emcap12634: HiCap 100: Lactose=40:20:40% (w/w)
    C: Miracap: HiCap 100: Dextrose=75:20:5% (w/w)
    D: Emcap12634: Stadex90: Lactose=50:20:30% (w/w).

Deionized water was used for both extrusion and spray drying. Compounded butter and lemonade flavors were used at 10 or 20% (w/w) flavor loads. The butter flavor contained 26% oleic fatty acid, 20% fractionated coconut oil, 5% emulsifier, and butter concentrate with minor flavoring components. The lemonade flavor contained 64% lemon oil, 13% five-fold lemon oil, 13% citral, and 5% emulsifier, with minor flavoring components.

Extrusion:

A 2" co-rotating twin-screw extruder equipped with a die containing multiple (0.79 mm) openings was used. Metered fluid streams of water and flavors were added to the dry feed port. Process parameters were optimized for the compositions used based on three major requirements: steady-state pressure in the die (not to exceed 70 kg/cm$^2$), product temperature (not to exceed 113° C.), and setting time of the product in a cold airflow (13° C.) (not to exceed 4 s). Temperatures greater than 113° C. lead to flavor loss in the form of steam and surface oil. The product was collected in the form of strands set in a glassy state and milled.

Setting time was evaluated as a minimum time needed for the strands to reach a brittle breaking point. Flavor steaming at the die exit was evaluated visually against a black background. The surface flavor on the strands was qualitatively evaluated by visual examination.

Spray-Drying:

Carrier dispersions were prepared by first dissolving lactose at 50° C. and then dispersing modified starches or their blends to a solution level of 40% (w/w) solids. Solutions were then cooled to near ambient temperature with continuous stirring. The flavors were then added to the starch-sugar solutions and an emulsion prepared by homogenizing with a Gaulin™ two-stage homogenizer (two passes set at 35 and 235 kg/cm$^2$). The viscosity of the starch-sugar dispersions and flavor emulsions as well as the mean particle size in the emulsions is shown in Table 1. The stability of emulsions against creaming decreased in the order: D>A>C>B. The emulsions were immediately spray-dried using a Niro™ pilot-plant spray-dryer at 180-190° C. inlet temperature and 90-95 g/min feed rate.

TABLE 1

Viscosity of Carrier Solutions and Flavor Emulsions Which Contain 20% of the Lemonade Flavor Prepared for Spray-Drying. Volume-Weighted Mean of the Particle Diameters in the Emulsions.

| Matrix Composition | Viscosity of Solution (cp) | Viscosity of Emulsion (cp) | Volume-Weighted Mean of Particle Diameter (μ) |
|---|---|---|---|
| A | 192.7 | 212.7 | 1.1 |
| B | 75.6 | 96.15 | 4.5 |
| C | 58.9 | 88.4 | 3.3 |
| D | 123.3 | 175.8 | 2.3 |

Measurements:

The elastic recovery of the extruded strands was calculated according to the formula:

$$(D-D_0)/D_0,$$

where D and $D_0$ are the diameter of strands and the die orifice, respectively. At least ten samples were measured with a Mitutoyo (Mitutoyo Corp.) digital caliper.

The viscosities of the starch-sugar dispersions and flavor emulsions before spray drying were measured with a Brookfield viscometer, model RVDV-II+DP (Brookfield Engineering Laboratories, Inc., Middleboro, Mass. 02346) at 25° C. and shear rate 100 s$^{-1}$.

The particle size distribution of flavor emulsions was determined with a Malvern particle size analyzer, model Mastersizer™ 2000 (Malvern Instruments). The emulsions were characterized as volume weighted mean of droplet diameters.

The particle density of milled extruded strands and spray-dried powders were measured with a Micromeritics powder pycnometer, model AccuRys 1330 (Micromeritics, Norcross, Ga. 30093) using helium as a filling gas.

Figure 3A:
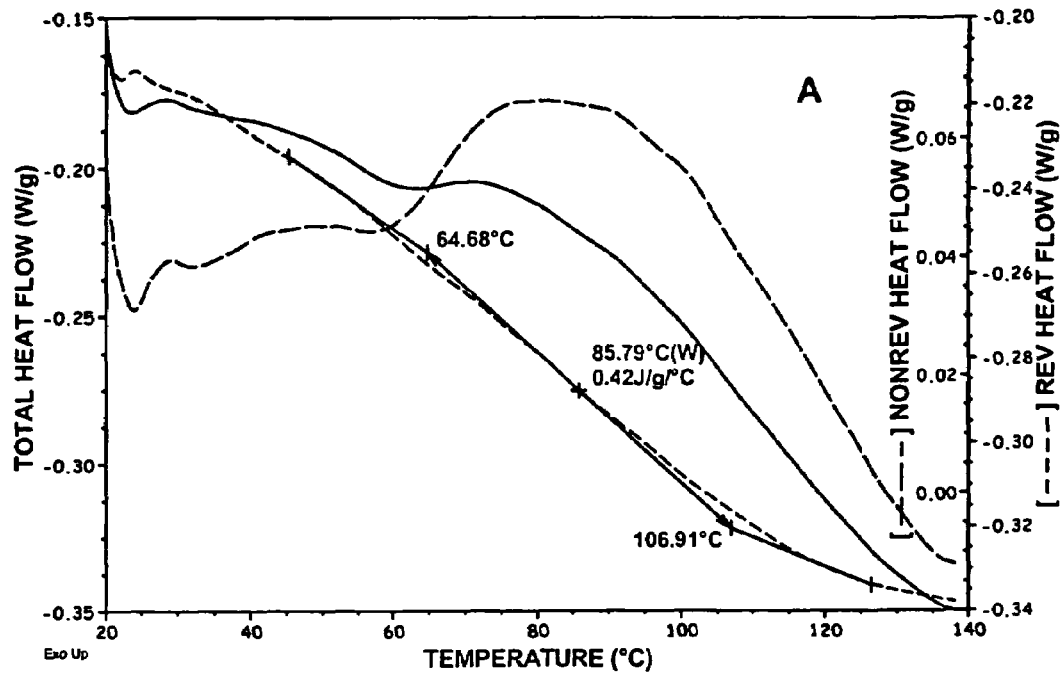
FIGS. 3A and 3B are Modulated Differential Scanning Calorimetric (MDSC) graphs of the spray-dried (A) and extruded (B) matrix composition D with 10% (w/w) lemonade flavor. The glass transition(s) is (are) shown on the reversing component of each graph.

A TA-Instruments Modulated Differential Scanning Calorimeter (MDSC) (TA Instruments, New Castle, Del. 19720) equipped with a DSC 2920 cell and a Refrigerated Cooling Unit was used to determine the glass transition temperatures, enthalpy relaxations, and heat capacity changes. Samples (up to 15 mg) were hermetically sealed in aluminum pans, and helium was used as a purge gas. The modulated mode employed a sinusoidal modulation of linearly increasing temperature, allowed separation of the thermal processes that followed (relatively fast processes as compared to the period of modulation), and did not follow (slow processes) the modulated temperature. The corresponding signals are referred to as reversing and non-reversing components, respectively. The glass transition is an example of the reversing transition, while enthalpy relaxation typically contributes to the non-reversing component (see, FIG. 3A). A heating ramp rate of 10° C./min was used in the range from −12 to 150° C. in combination with +/−1° C. modulation amplitude and 30 s period of modulation. An onset temperature and a midpoint temperature between the onset and the end of transition characterized the glass transition temperature interval. The MDSC tests were run in duplicate.

Caking of the extruded and milled samples was determined after one-week storage of the samples in sealed glass jars at 20° C., 32° C., and 41° C. Addition of 0.5% (w/w) of silicon dioxide (Sipernat 22S, Degussa) after milling was employed as an anticaking agent. The relative degree of caking was based on the degree of mechanical disturbance needed to break the particles apart. Caking was considered light if particles were separated after one turn of the jar along its axis of symmetry. If multiple turns were needed, then the caking was considered moderate. Finally, heavy caking was assigned when tapping was required to break the particles apart.

The total amount of oil-soluble (ether-extractable) components of butter flavor (total flavor or flavor retention) in the extruded and spray-dried samples was determined by acid hydrolysis followed by extraction with ethyl and petroleum ethers (AOAC 2002b, Total Fat by Acid Hydrolysis, AOAC Official Methods of Analysis (1995), Ch. 32, p. 5). The total amount of volatile components of lemonade flavor was determined in extruded and spray-dried samples by steam distillation (AOAC 2002a, Volatile Oil by Steam Distillation, AOAC Official Methods of Analysis (1995), Ch. 43, pp. 3-4). A correction was made to switch from v/w units used in the method to w/w units, using a specific gravity of 0.868 g/ml for the lemonade flavor. Another correction was made on the non-volatile part of lemonade flavor containing about 6% of non-volatile components.

The amount of surface flavor (surface oil) was determined for the extruded and spray-dried compositions in the case of the butter flavor by Soxlet extraction for 20 h with ethyl ether (AOAC 2002a, Non-Volatile Oil by Solvent Extraction, AOAC Official Methods of Analysis (1995), Ch. 32, p. 5, and Ch. 43, p. 2). The amount of surface lemonade flavor was determined by Soxlet extraction followed by analysis for limonene by gas chromatography (GC).

Processing Parameters:

The extrusion processing parameters such as melt temperature and die pressure were optimized to yield a minimum setting time of the material into the glassy state while assuring no significant flavor loss nor excessive stress on the equipment. Material in this state is brittle and can be milled without further processing. The above optimization was performed by the adjustment of added water level (see, Tables 2 and 3). Two counteracting properties had to be balanced during optimization: viscosity (or viscoelasticity) of the melt and glassy characteristics of the melt upon cooling. Water helps to reduce viscosity of the melt by its plasticization function that is critical for processing. At the same time, the increased water level reduces the glass transition temperature and shifts a glassy state towards the amorphous equilibrium state, thus, enhancing diffusion and reducing flavor protection (data not shown).

Optimized processing parameters varied widely for the extrusion compositions (A-D) being sensitive to the type of polymer and sugar, polymer-sugar ratio and initial moisture content of the blends (see, Tables 2 and 3). In contrast, the parameters for spray drying were held virtually constant and were insensitive to carrier composition. Composition C was the most efficient for extrusion encapsulation of lemonade flavor, while all four compositions were effective in encapsulating butter flavor. The higher volatility and hydrophobic character of terpenes in lemonade flavor reduced efficacy of the extrusion carrier.

TABLE 2

Extrusion Processing Parameters and Qualitative Descriptors for the Extruded Compositions Which Contain 10% of the Lemonade Flavor.

| Example No. | Matrix Composition | Water Flow (g/m) | Melt Temperature (° C.) | Setting Time (sec) | Free Flavor; Steaming | Free Flavor; Surface Oil |
|---|---|---|---|---|---|---|
| 6 | A | 5 | 108 | 3 | Light Intermittent | Light |
| 7 | B | 5 | 112 | 3 | Heavy | Light |
| 8 | C | 10 | 111 | 2-3 | Light to None | Very Light to None |
| 9 | D | 6.5 | 118 | 2-3 | Light Intermittent | Light to None |

TABLE 3

Extrusion Processing Parameters and Qualitative Descriptors for the Extruded Compositions Which Contain 10% of the Butter Flavor.

| Example No. | Matrix Composition | Water Flow (g/m) | Melt Temperature (° C.) | Setting Time (sec) | Free Flavor; Steaming | Free Flavor; Surface Oil |
|---|---|---|---|---|---|---|
| 10 | A | 5 | 104 | 3 | No | Light to None |
| 11 | B | 5 | 110 | 3 | No | Very Light to Light |
| 12 | C | 8 | 110 | 2-3 | No | Very Light to Light |
| 13 | D | 6 | 106 | 2-3 | No | Light to None |

Comparing melt temperature and pressure for the same compositions associated with lemonade or butter flavor, reduced temperatures and/or pressures in the presence of lemonade flavor are observed (see, Tables 2 and 3). Pressure decreased for the compositions in the order A>D>B>C consistently for both flavors. Reduced pressure in the presence of lemonade flavor indicates that the extrusion processing is effected by not only the carbohydrate composition but also the flavor through its interaction with the carrier. These interactions change the rheology of the melt.

Extrusion processing parameters are a function of the viscoelastic properties of the polymer-sugar melt. These properties in turn are a function of the melt composition and water content. Glass transition parameters of the solid materials also depend on the composition, cooling rate and water content. Therefore, a strong relation can be expected between processing parameters, glass transition characteristics, and other properties of the resulting materials.

Water content, glass transition temperature (Tg), heat capacity change ($\Delta C_p$) and enthalpy relaxation ($\Delta H$):

Glass transition parameters are essentially controlled by water content in the compositions (Roos, Y. H., "Prediction of the Physical State," in *Phase Transitions in Foods*, Academic Press, San Diego, 1995). The water content of the optimized extruded compositions fall into a narrow range of 8.0±0.3% w/w (see, Tables 4 and 5). Total water content is a sum of the initial moisture of a dry blend and the water added to the composition. This water content range is optimum to balance the counteracting requirements of low melt viscosity and rapid setting of the melt into a glass. The latter in turn provides for the glass transition temperature above ambient. Indeed, the lower water content of a composition, the higher its glass transition temperature and the higher melt viscosity (data not shown). The water content in the extruded compositions controls not only melt properties but through glass transition parameters also many critical properties of the final compositions. Water content was not a limiting factor in spray drying where the total solids and viscosity of the fully hydrated blends (see, Table 1) can be easily modified by drier operating conditions to keep the final water content of all the resulting compositions below 4%.

TABLE 6

Water Content and Glass Transition Parameters of Spray-Dried Compositions Which Contain 10% of the Lemonade Flavor.

| Example No. | Matrix Comp. | Water %, w/w | $Tg_1$ Onset (° C.) | $Tg_1$ (° C.) | $\Delta Cp_1$ (J/g/° C.) | $\Delta H_{rel1}$ (J/g) |
|---|---|---|---|---|---|---|
| 14 | A | 2.3 | 69.3 | 82 | 0.38 | 1.18 |
| 15 | B | 1.9 | 84.7 | 95.5 | 0.36 | 1.36 |
| 16 | C | 3 | 84.5 | 99.1 | 0.32 | 2.77 |
| 17 | D | 3.3 | 60.8 | 84.4 | 0.47 | 4.9 |

TABLE 7

Water Content and Glass Transition Parameters of Spray-Dried Compositions Which Contain 20% of the Lemonade Flavor.

| Example No. | Matrix Comp. | Water %, w/w | $Tg_1$ Onset (° C.) | $Tg_1$ (° C.) | $\Delta Cp_1$ (J/g/° C.) | $\Delta H_{rel1}$ (J/g) |
|---|---|---|---|---|---|---|
| 18 | A | 2.4 | 68.8 | 82.4 | 0.38 | 3.2 |
| 19 | B | 1.9 | 78.6 | 89.6 | 0.35 | 1.74 |
| 20 | C | 4.2 | 55.3 | 68.2 | 0.29 | 3.93 |
| 21 | D | 4 | 63.1 | 77.3 | 0.29 | 1.73 |

TABLE 8

Water Content and Glass Transition Parameters of Spray-Dried Compositions Which Contain 20% of the Butter Flavor.

| Example No. | Matrix Comp. | Water %, w/w | $Tg_1$ Onset (° C.) | $Tg_1$ (° C.) | $\Delta Cp_1$ (J/g/° C.) | $\Delta H_{rel1}$ (J/g) |
|---|---|---|---|---|---|---|
| 22 | A | 2 | 78.3 | 90.3 | 0.26 | 1.1 |
| 23 | B | 1.8 | 82.8 | 92.6 | 0.24 | 0.73 |
| 24 | C | 2 | 81.3 | 97.3 | 0.34 | 2.14 |
| 25 | D | 1.4 | 65 | 79.4 | 0.21 | 1.65 |

The glass transition temperature and the heat capacity change characterize key physical states of a solid carrier over

TABLE 4

Water Content and Glass Transition Parameters of Extruded Compositions Which Contain 10% of the Lemonade Flavor.

| Example No. | Matrix Comp. | Water %, w/w | $Tg_1$ Onset (° C.) | $Tg_1$ (° C.) | $\Delta Cp_1$ (J/g/° C.) | $\Delta H_{rel1}$ (J/g) | $Tg_2$ Onset (° C.) | $Tg_2$ (° C.) | $\Delta Cp_2$ (J/g/° C.) | $\Delta H_{rel2}$ (J/g) |
|---|---|---|---|---|---|---|---|---|---|---|
| 6 | A | 7.7 | 13.1 | 16.2 | 0.08 | −1.02 | 28.2 | 33.8 | 0.11 | −0.94 |
| 7 | B | 7.6 | 14.6 | 16.3 | 0.05 | −0.36 | 25.6 | 31.2 | 0.14 | −0.7 |
| 8 | C | 7.7 | 4.7 | 6.7 | 0.07 | −0.29 | 23 | 27.5 | 0.14 | −1.58 |
| 9 | D | 8.2 | 22.3 | 26.5 | 0.09 | −0.13 | 47.2 | 50.6 | 0.14 | −4.49 |

TABLE 5

Water Content and Glass Transition Parameters of Extruded Compositions Which Contain 10% of the Butter Flavor.

| Example No. | Matrix Comp. | Water %, w/w | $Tg_1$ Onset (° C.) | $Tg_1$ (° C.) | $\Delta Cp_1$ (J/g/° C.) | $\Delta H_{rel1}$ (J/g) | $Tg_2$ Onset (° C.) | $Tg_2$ (° C.) | $\Delta Cp_2$ (J/g/° C.) | $\Delta H_{rel2}$ (J/g) |
|---|---|---|---|---|---|---|---|---|---|---|
| 10 | A | 7.8 | 5.39 | 14.7 | 0.29 | −2.64 | 39.5 | 46.7 | 0.09 | −0.1 |
| 11 | B | 7.5 | 15.07 | 17.1 | 0.05 | −0.78 | 26.6 | 31 | 0.11 | −0.25 |
| 12 | C | 8.6 | 14.9 | 17.7 | 0.06 | −0.08 | 28.7 | 39.3 | 0.26 | −1.64 |
| 13 | D | 8.2 | 22.9 | 29 | 0.1 | −0.26 | 49.9 | 53.2 | 0.06 | −3.06 | a specific temperature range. The glassy state of a carrier is a preferred encapsulation state for flavors and provides stability against flavor loss and oxidation. A higher glass transition temperature assures that the material remains in the glassy state at ambient and slightly elevated temperature. The larger heat capacity change ($\Delta C_p$) indicates that more domains of the material are farther away from equilibrium in the glassy state.

Another component of the glass transition is that of enthalpy relaxation. This characteristic reflects the cooling history of a sample, and how far the material is from the equilibrium state. If cooling during glass formation is faster than the heating rate of DSC analysis, the enthalpy relaxation is exothermic (Roos, Y. H., "Prediction of the Physical State," in *Phase Transitions in Foods*, Academic Press, San Diego, 1995). This is typical for spray-dried compositions when evaporation of water and cooling sets material into the glassy state in the order of seconds (see, FIG. 3A). However if the step of setting into the glassy state is a slow process compared to the rate of heating during DSC analysis, then the enthalpy relaxation is endothermic. This is the case for those extruded compositions (FIG. 3B) setting slowly at ambient temperature, i.e., tens of seconds or longer without forced cooling by chilled airflow. Modulated DSC allows separation and quantification of the reversing component of the heat capacity change and non-reversing enthalpy relaxation during glass transition.

Tg and $\Delta C_p$ of the extruded compositions are significantly lower than those of the corresponding spray-dried materials (see, Tables 4-8). This is due to the spray-dried compositions having lower water contents along with their shorter setting time into the glass. The Tgs of similar compositions are close regardless of flavor. As a trend, the Tgs of the lemonade flavor compositions are lower than the Tgs of the identical compositions with butter flavor. Melt pressure-temperature combinations during processing of the lemonade flavor was somewhat lower also (see, Table 2). This indicates a plasticizing effect by some components (most likely citral) in the lemonade flavor on carrier.

Figure 3B:
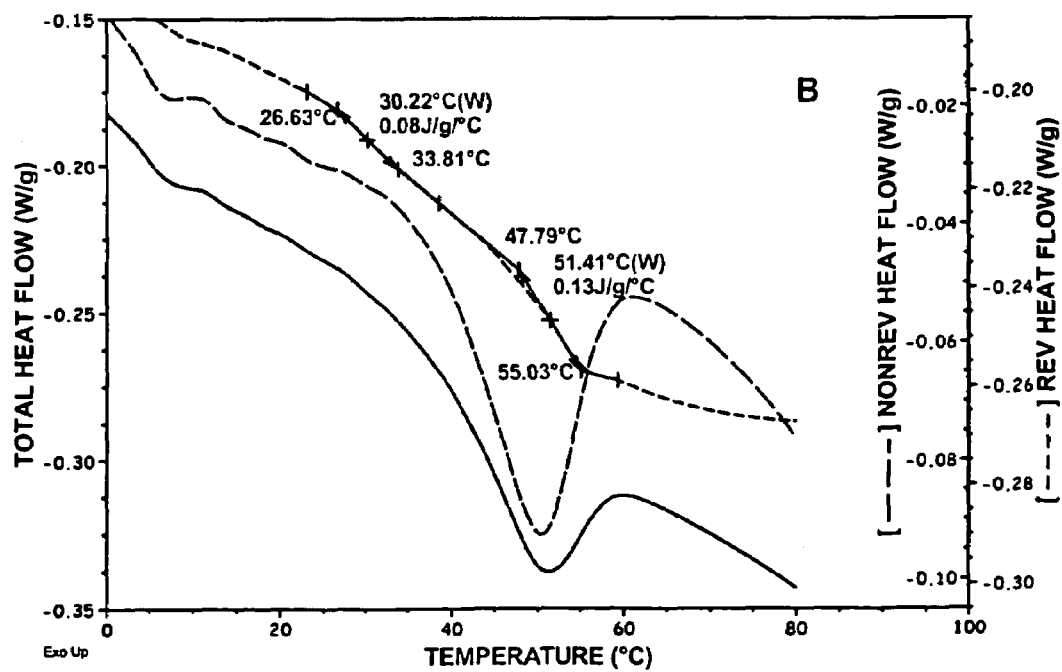

Extruded compositions exhibiting two glass transitions are revealed by the reversing component of the MDSC signal (see, FIG. 3B, Tables 4 and 5). One of the glass transitions, usually at lower temperature, exhibits a lower heat capacity change. An assumption of a biphasic structure of polymer1-polymer2-sugar matrix can explain such responses. The presence of two glass transitions is rather common for extruded polymer blends both natural and synthetic (Manson, J. A. and Sperling, L. H., *Polymer Blends and Composites*, Plenum Press, New York and London, 1976; Sperling, L. H., "Glass-Rubber Transition Behavior," in *Introduction to Physical Polymer Science*, John Wiley and Sons, New York, 1986; and Yuryev, V. P., Zasypkin, D. V., Ghenin, Ya. V., Zhukov, V. A., Alexeyev, V. V., and Tolstoguzov, V. B., "Role of maltodextrin in promoting structure formation in extruded soya isolate" *Carbohydrate Polymers*, vol. 15, pp. 243-253, 1991). Two glass transitions were also observed for a number of food polymer1-polymer2-sugar combinations (Zasypkin, D. V. and Porzio, M., "Extrusion encapsulation of flavors using modified starch-sugar/polyol glassy matrices," *Book of Abstracts, 223rd ACS National Meeting*, Abstract #25, 2002). In some cases, the two glass transitions have almost equivalent, large $\Delta C_p$ values. Spray-dried compositions containing the two polymers and sugar do not exhibit two glass transitions. Instead one broad transition was observed (see, FIG. 3A).

Two structural phases in the melt can be formed as a result of incompatibility of polymers and/or incomplete mixing of polymers and lactose in the high viscosity melt during the short process. Incomplete mixing may be a dominant mechanism.

Elastic Recovery (ER) and Particle Density (PD):

The elastic recovery (ER) of the plastic strands exiting the die is a result of deformation of the viscoelastic carbohydrate melt. This property is the most important factor (after the die hole diameter) in determining the diameter of set strands and final particles. ER is a function of melt pressure, and to a lesser extent the temperature of the melt at the die and glass transition parameters. With higher melt pressure the ER increases (see, Tables 2, 3, 9, and 10). This trend can be observed for a number of compositions containing both types of flavor.

TABLE 9

Elastic Recovery and Particle Density of the Extruded Compositions Which Contain 10% of the Lemonade Flavor.

| Example No. | Matrix Composition | Elastic Recovery $(D - D_0)/D_0$; %) | Particle Density (g/cm$^3$) |
|---|---|---|---|
| 6 | A | 16.6 ± 5.2 | 1.428 |
| 7 | B | 9.3 ± 4.0 | 1.427 |
| 8 | C | 4.8 ± 2.0 | 1.408 |
| 9 | D | 13.2 ± 2.5 | 1.461 |

TABLE 10

Elastic Recovery and Particle Density of the Extruded Compositions Which Contain 10% of the Butter Flavor.

| Example No. | Matrix Composition | Elastic Recovery $(D - D_0)/D_0$; %) | Particle Density (g/cm$^3$) |
|---|---|---|---|
| 10 | A | 16.3 ± 2.3 | 1.443 |
| 11 | B | 10.3 ± 2.3 | 1.444 |
| 12 | C | 11.5 ± 1.9 | 1.44 |
| 13 | D | 22.3 ± 3.0 | 1.46 |

TABLE 11

Particle Density of the Spray Dried Compositions Which Contain 10% of the Lemonade Flavor.

| Example No. | Matrix Composition | Particle Density (g/cm$^3$) |
|---|---|---|
| 14 | A | 1.178 |
| 15 | B | 0.967 |
| 16 | C | 0.881 |
| 17 | D | 1.013 |

TABLE 12

Particle Density of the Spray Dried Compositions Which Contain 20% of the Lemonade Flavor.

| Example No. | Matrix Composition | Particle Density (g/cm$^3$) |
|---|---|---|
| 18 | A | 1.178 |
| 19 | B | 0.99 |
| 20 | C | 1.17 |
| 21 | D | 1.255 |

TABLE 13

Particle Density of the Spray Dried Compositions Which Contain 20% of the Butter Flavor.

| Example No. | Matrix Composition | Particle Density (g/cm$^3$) |
| --- | --- | --- |
| 22 | A | 1.186 |
| 23 | B | 1.077 |
| 24 | C | 1.014 |
| 25 | D | 0.939 |

The particle density (PD) of the extruded particles was close to that of native or molten starch granules (see, Tables 9 and 10) (Zasypkin, D. V., Yuryev, V. P., Alexeyev, V. V., and Tolstoguzov, V. B., "Mechanical properties of the products obtained by the thermoplastic extrusion of potato starch-soybean protein mixtures," *Carbohydrate Polymers*, vol. 18, pp. 119-124 (1992)). For the same compositions, the PD was somewhat lower with the lemonade flavor. This can be explained by the higher specific gravity of the butter flavor itself: 0.956 g/cm$^3$ versus 0.868 g/cm$^3$ for the lemonade flavor.

The PD of the spray-dried powders is markedly lower than that of extruded compositions. It is well documented that spray-dried particles have hollows inside them, which effectively reduce the specific gravity of these particles (Chang, Y. I., Scire, J., and Jacobs, B., "Effect of particle size and microstructure properties on encapsulated orange oil," in *Flavor Encapsulation*, edited by S. J. Risch and G. A. Reineccius, ACS, Washington, 1988).

Flavor Retention and Surface Flavor:

The total amount of flavor in the extruded products was on average about 80% of the theoretical value, indicating a significant level of flavor loss during extrusion and milling (see, Tables 14 and 15). The higher volatility components of the lemonade flavor lead to a greater degree of flavor loss. Butter flavor loss was less, but a significant amount of the flavor was detected on the surface of particles.

The flavor retention of the spray-dried compositions was above 85% (see, Tables 16-18). Flavor retention of the lemonade flavor at both flavor loads is higher in the spray-dried samples than in the extruded ones. Surface flavor is significantly lower for the spray-dried compositions. Higher glass transition temperatures, reduced setting times into the glassy state and the absence of further processing all contribute to the higher flavor retention and low surface flavor of the spray-dried compositions.

Based on flavor retention and surface oil, matrix composition C may be preferred for encapsulation of both flavors by extrusion. Low pressure-low temperature combination, least flavor loss, lowest elastic recovery and strongest glassy character (largest $\Delta C_p$) result with matrix composition C (see, Tables 2-5, 9, 10, 14, and 15). Using the same criteria of high flavor retention and low surface oil, matrix composition A may be preferred for encapsulation of the lemonade flavor by spray drying.

TABLE 14

Flavor Retention and Surface Oil in the Extruded Compositions Which Contain 10% of the Lemonade Flavor.

| Example No. | Matrix Composition | Total Flavor (%, v/w) | Surface Oil (limonene, mg/g) |
| --- | --- | --- | --- |
| 6 | A | 7.9 | 58 |
| 7 | B | 9.1 | 52 |
| 8 | C | 9.6 | 23 |
| 9 | D | 5.9 | 92 |

TABLE 15

Flavor Retention and Surface Oil in the Extruded Compositions Which Contain 10% of the Butter Flavor.

| Example No. | Matrix Composition | Total Flavor (%, w/w) | Surface Oil (butter, %, w/w) |
| --- | --- | --- | --- |
| 10 | A | 9.1 | 0.39 |
| 11 | B | 8.2 | 0.34 |
| 12 | C | 8.1 | 0.21 |
| 13 | D | 8.2 | 0.84 |

TABLE 16

Flavor Retention and Surface Oil in the Spray-Dried Compositions Which Contain 10% of the Lemonade Flavor.

| Example No. | Matrix Composition | Total Flavor (%, v/w) | Surface Oil (limonene, mg/g) |
| --- | --- | --- | --- |
| 14 | A | 9.8 | 7 |
| 15 | B | 9.4 | 24 |
| 16 | C | 9 | 33 |
| 17 | D | 9.6 | 22 |

TABLE 17

Flavor Retention and Surface Oil in the Spray-Dried Compositions Which Contain 20% of the Lemonade Flavor.

| Example No. | Matrix Composition | Total Flavor (%, v/w) | Surface Oil (limonene, mg/g) |
| --- | --- | --- | --- |
| 18 | A | 19.2 | 52 |
| 19 | B | 18.9 | 111 |
| 20 | C | 18.4 | 84 |
| 21 | D | 18.4 | 323 |

TABLE 18

Flavor Retention and Surface Oil in the Spray-Dried Compositions Which Contain 20% of the Butter Flavor.

| Example No. | Matrix Composition | Total Flavor (%, w/w) | Surface Oil (butter, %, w/w) |
| --- | --- | --- | --- |
| 22 | A | 17.1 | 0.03 |
| 23 | B | 18.9 | 0.07 |
| 24 | C | 18.9 | 0.17 |
| 25 | D | 20.3 | 0.07 |

Caking:

The caking response of powdered material during storage is one key stability characteristic. This property is more critical for extruded compositions because of their higher moisture content (about 8% as compared to below 4% for spray-dried compositions). The caking of extruded compositions was evaluated at ambient temperature, 32° C., and 41° C. (see, Tables 19 and 20). Matrix composition D was least susceptible to caking followed by matrix composition A with lemonade flavor, and matrix compositions C and B with butter flavor. Matrix composition D has the lowest amount of OSAN-starch and one of the highest amounts of surface oil. Comparing the Tg of the extruded compositions (see, Tables 4 and 5), it is seen that matrix composition D has the highest glass transition temperatures for both flavors, followed by matrix composition C with butter flavor considering only the major transition. Therefore, the glass transition temperature and the value of heat capacity change during glass transition is a good predictor of caking properties at elevated temperatures.

TABLE 19

Caking Properties for the Extruded Compositions Which Contain 10% of the Lemonade Flavor (0.5% w/w of the anitcaking agent, SIPERNAT 50, was added to the milled strands).

| Example No. | Matrix Composition | Ambient Temperature | 1 Week @ 32° C. | 1 Week @ 41° C. |
|---|---|---|---|---|
| 6 | A | No | Very Light to Light | Light to Moderate |
| 7 | B | No | Light to Moderate | Heavy |
| 8 | C | No | Light | Moderate to heavy |
| 9 | D | No | No | No |

TABLE 20

Caking Properties for the Extruded Compositions Which Contain 10% of the Butter Flavor (0.5% w/w of the anitcaking agent, SIPERNAT 50, was added to the milled strands).

| Example No. | Matrix Composition | Ambient Temperature | 1 Week @ 32° C. | 1 Week @ 41° C. |
|---|---|---|---|---|
| 10 | A | No | Light | Moderate to Heavy |
| 11 | B | No | None to Very Light | Light |
| 12 | C | No | No | Light to Moderate |
| 13 | D | No | No | None to Very Light |

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An encapsulation composition, comprising:
(A) an encapsulate, encapsulated in:
(B) a glassy matrix,
wherein said glassy matrix is:
(a) a composition, comprising:
($a_1$) 5 to 95% by weight, based on the total weight of said composition (a), of a first food polymer;
($a_2$) 5 to 90% by weight, based on the total weight of said composition (a), of a second food polymer; and
($a_3$) 0 to 45% by weight, based on the total weight of said composition (a), of a component selected from the group consisting of a sugar, a polyol, a corn syrup solid, and mixtures thereof,
wherein said first food polymer is an n-octenylsuccinic anhydride-modified starch, and
wherein said second food polymer is selected from the group consisting of an exudate gum, a bacterial gum, an extract gum, a seed gum, a pectin, a pregelatinized starch, agar agar, a hydrogenated starch hydrolyzate, a modified cellulose, a seaweed hydrocolloid extract, a protein, a fractionated protein, a hydrolyzed protein, and chitosan.

2. The composition of claim 1, which has at least one glass transition temperature >30° C.

3. The composition of claim 1, which has at least one glass transition temperature >40° C.

4. The composition of claim 1, which has two glass transition temperatures.

5. The composition of claim 1, wherein said matrix (B) is a composition comprising 1 to 45% by weight, based on the total weight of said composition (a), of said component selected from the group consisting of a sugar, a polyol, a corn syrup solid, and mixtures thereof.

6. The composition of claim 1, wherein said encapsulate is selected from the group consisting of a medication, a pesticide, a vitamin, a preservative, and a flavoring agent.

7. The composition of claim 6, wherein said encapsulate is a flavoring agent.

8. The composition of claim 7, wherein said flavoring agent is selected from the group consisting of a natural extract, an oleoresin, an essential oil, a protein hydrolyzate, an aqueous reaction flavor, and a compounded flavor.

9. The composition of claim 1, wherein said second food polymer is at least one member selected from the group consisting of gum arabic, gum karaya, gum tragacanth, konjac, larch gum, locust bean gum, guar gum, xanthan gum, sodium carboxymethyl cellulose, agar agar, type A gelatin, type B gelatin, and mixtures thereof.

10. An encapsulate composition, prepared by a process comprising:
(i) mixing a matrix composition (B) with a liquid plasticizer and an encapsulate (A) in an extruder, to obtain a melted mixture comprising encapsulate (A) and matrix (B); and
(ii) extruding said melted mixture, to obtain said composition,
wherein said encapsulate (A) is encapsulated in a glassy matrix of said matrix composition (B), and
wherein said matrix composition (B) is selected from the group consisting of:
(a) a composition, comprising:
($a_1$) 5 to 95% by weight, based on the total weight of said composition (a), of a first food polymer;
($a_2$) 5 to 90% by weight, based on the total weight of said composition (a), of a second food polymer; and
($a_3$) 0 to 45% by weight, based on the total weight of said composition (a), of a component selected from the group consisting of a sugar, a polyol, a corn syrup solid, and mixtures thereof,
wherein said first food polymer is an n-octenylsuccinic anhydride-modified starch, and
wherein said second food polymer is selected from the group consisting of an exudate gum, a bacterial gum, an extract gum, a seed gum, a pectin, a pregelatinized starch, agar agar, a hydrogenated starch hydrolyzate, a modified cellulose, a seaweed hydrocolloid extract, a protein, a fractionated protein, a hydrolyzed protein, and chitosan.

11. The composition of claim 10, which has at least one glass transition temperature >30° C.

12. The composition of claim 10, which has at least one glass transition temperature >40° C.

13. The composition of claim 10, which has two glass transition temperatures.

14. The composition of claim 10, wherein said encapsulate is selected from the group consisting of a medication, a pesticide, a vitamin, a preservative, and a flavoring agent.

15. The composition of claim 14, wherein said encapsulate is a flavoring agent.

16. The composition of claim 15, wherein said flavoring agent is selected from the group consisting of a natural extract, an oleoresin, an essential oil, a protein hydrolyzate, an aqueous reaction flavor, and a compounded flavor.

17. The composition of claim 10, wherein said matrix (B) is a composition comprising 1 to 45% by weight, based on the total weight of said composition (a), of said component selected from the group consisting of a sugar, a polyol, a corn syrup solid, and mixtures thereof.

18. The composition of claim 10, wherein said second food polymer is at least one member selected from the group consisting of gum arabic, gum karaya, gum tragacanth, konjac, larch gum, locust bean gum, guar gum, xanthan gum, sodium carboxymethyl cellulose, agar agar, type A gelatin, type B gelatin, and mixtures thereof.

19. A process for preparing an encapsulation composition, said process comprising:
   (i) mixing a matrix composition (B) with a liquid plasticizer and an encapsulate (A) in an extruder, to obtain a melted mixture comprising encapsulate (A) and matrix (B); and
   (ii) extruding said melted mixture, to obtain said composition,
   wherein said encapsulate (A) is encapsulated in a glassy matrix of said matrix composition (B), and
   wherein said matrix composition (B) is selected from the group consisting of:
   (a) a composition, comprising:
      ($a_1$) 5 to 95% by weight, based on the total weight of said composition (a), of a first food polymer;
      ($a_2$) 5 to 90% by weight, based on the total weight of said composition (a), of a second food polymer; and
      ($a_2$) 0 to 45% by weight, based on the total weight of said composition (a), of a component selected from the group consisting of a sugar, a polyol, a corn syrup solid, and mixtures thereof,
   wherein said first food polymer is an n-octenylsuccinic anhydride-modified starch, and
   wherein said second food polymer is selected from the group consisting of an exudate gum, a bacterial gum, an extract gum, a seed gum, a pectin, a pregelatinized starch, agar agar, a hydrogenated starch hydrolyzate, a modified cellulose, a seaweed hydrocolloid extract, a protein, a fractionated protein, a hydrolyzed protein, and chitosan.

20. The process of claim 19, wherein said encapsulate is selected from the group consisting of a medication, a pesticide, a vitamin, a preservative, and a flavoring agent.

21. The process of claim 20, wherein said encapsulate is a flavoring agent.

22. The process of claim 21, wherein said flavoring agent is selected from the group consisting of a natural extract, an oleoresin, an essential oil, a protein hydrolyzate, an aqueous reaction flavor, and a compounded flavor.

23. The process of claim 19, wherein said matrix (B) is a composition comprising 1 to 45% by weight, based on the total weight of said composition (a), of said component selected from the group consisting of a sugar, a polyol, a corn syrup solid, and mixtures thereof.

24. The process of claim 19, wherein said second food polymer is at least one member selected from the group consisting of gum arabic, gum karaya, gum tragacanth, konjac, larch gum, locust bean gum, guar gum, xanthan gum, sodium carboxymethyl cellulose, agar agar, type A gelatin, type B gelatin, and mixtures thereof.

* * * * *